US012307558B2

United States Patent
He et al.

(10) Patent No.: US 12,307,558 B2
(45) Date of Patent: May 20, 2025

(54) SALINE CONTRAST ELECTRICAL IMPEDANCE LUNG PERFUSION AND CARDIAC IMAGING IMAGE RECONSTRUCTION AND ANALYSIS METHOD, SYSTEM, DEVICE THEREOF

(71) Applicant: PEKING UNION MEDICAL COLLEGE HOSPITAL, Beijing (CN)

(72) Inventors: Huaiwu He, Beijing (CN); Liangyu Mi, Beijing (CN); Siyi Yuan, Beijing (CN); Mengru Xu, Beijing (CN); Yun Long, Beijing (CN); Qianlin Wang, Beijing (CN); Yingying Yang, Beijing (CN); Zhanqi Zhao, Beijing (CN)

(73) Assignee: PEKING UNION MEDICAL COLLEGE HOSPITAL, Beijing (CN)

( * ) Notice: Subject to any disclaimer, the term of this patent is extended or adjusted under 35 U.S.C. 154(b) by 0 days.

(21) Appl. No.: 18/963,483

(22) Filed: Nov. 27, 2024

(65) Prior Publication Data
US 2025/0095238 A1 Mar. 20, 2025

Related U.S. Application Data

(63) Continuation of application No. PCT/CN2023/099037, filed on Jun. 8, 2023.

(51) Int. Cl.
*G06T 11/00* (2006.01)

(52) U.S. Cl.
CPC ........ *G06T 11/005* (2013.01); *G06T 2210/41* (2013.01)

(58) Field of Classification Search
CPC .............. G06T 11/005; G06T 2210/41
See application file for complete search history.

(56) References Cited

U.S. PATENT DOCUMENTS

| 5,626,146 A | 5/1997 | Barber et al. |
| 2008/0260092 A1 | 10/2008 | Imai et al. |
| 2009/0074267 A1 | 3/2009 | Pedrizzetti et al. |

(Continued)

FOREIGN PATENT DOCUMENTS

| CN | 1579324 A | 2/2005 |
| CN | 105007818 A | 10/2015 |

(Continued)

OTHER PUBLICATIONS

Xu et al. NPL "Lung Perfusion Assessment by Bedside Electrical Impedance Tomography in Critically Ill Patients" (Year: 2021).*
Huaiwu He, Technical specification and clinical application of pulmonary perfusion electrical impedance tomography with hypertonic saline contrast, Journal, Dec. 31, 2021, p. 1-5, Chinese Medical Journal, China.

(Continued)

*Primary Examiner* — Andrew W Bee
*Assistant Examiner* — Winta Gebreslassie
(74) *Attorney, Agent, or Firm* — Ming Jiang; OPENPTO US LLC

(57) ABSTRACT

The disclosure relates to the field of medical image analysis, in particular to an image reconstruction and analysis method, system and device for saline contrast electrical impedance pulmonary perfusion and cardiac imaging. A saline contrast lung perfusion image reconstruction method, a pulsatile perfusion image reconstruction method, lung perfusion and regional V/Q noninvasive imaging method are included. The disclosure has very good application value in accurate reconstruction of medical images.

10 Claims, 26 Drawing Sheets

(56) References Cited

U.S. PATENT DOCUMENTS

2015/0379706 A1 12/2015 Leonhardt et al.
2016/0242723 A1 8/2016 Nambu et al.
2020/0327672 A1 10/2020 Yao

FOREIGN PATENT DOCUMENTS

| | | |
|---|---|---|
| CN | 109146835 A | 1/2019 |
| CN | 109745046 A | 5/2019 |
| CN | 110717961 A | 1/2020 |
| CN | 111449657 A | 7/2020 |
| CN | 111543993 A | 8/2020 |
| CN | 112244884 A | 1/2021 |
| CN | 113052937 A | 6/2021 |
| CN | 114073536 A | 2/2022 |
| CN | 114519708 A | 5/2022 |
| CN | 114533036 A | 5/2022 |
| KR | 101991250 B1 | 6/2019 |
| WO | 2006085166 A2 | 8/2006 |

OTHER PUBLICATIONS

Huaiwu He, Yi Chi, Yun Long, Siyi Yuan, Rui Zhang, Inéz Frerichs, Knut Möller, Feng Fu, Zhangi Zhao, Bedside Evaluation of Pulmonary Embolism by Saline Contrast Electrical Impedance Tomography Method: A Prospective Observational Study, Journal, Nov. 30, 2020, p. 1464-1467, Amercian Journal Respiratory and Oritical Care Medicine.Amercian.

Mengru Xu, Lung Perfusion Assessment by Bedside Electrical Impedance Tomography in Critically Ill Patients,Hournal, Oct. 31st, 2021, p. 1-11,Forntires in Physiology.

Yi Chi, Huiawu He, Siyi Yuan, Zhanqi Zhao, Yu Long, Monitoring positive end-expiratory pressure titration in patients with acute respiratory distress syndrome by electrical impedance imaging, Jorunal, May 31, 2018,,Chinese Electronic Journal of Critical Care Medicine, China.

Guoxun Zhang, Caixia Zhang, Zhiguo Wang, Xianying Chen, Wei Deng, Zhuang Ma, The clinical value of SPECT/CT image fusion in diagnosing pulmonary embolism, Journal, Apr. 15, 2008, vol. 02, Journal of Clinical Military Medicine, China.

* cited by examiner left heart phase: saline returning to the left heart series imaging phase through lung circulation saline contrast time-impedance curve // SALINE CONTRAST ELECTRICAL IMPEDANCE LUNG PERFUSION AND CARDIAC IMAGING IMAGE RECONSTRUCTION AND ANALYSIS METHOD, SYSTEM, DEVICE THEREOF

CROSS-REFERENCE TO RELATED APPLICATIONS

This patent application is a continuation of an International Patent Application No. PCT/CN2023/099037, which claims priority of Chinese Patent Application No. 202210654812.2 filed on Jun. 10, 2022, and Chinese Patent Application No. 202211532639.5 filed on Dec. 2, 2022, and Chinese Patent Application No. 202211532638.0 filed on Dec. 2, 2022, and Chinese Patent Application No. 202210649287.5 filed on Jun. 10, 2022, and Chinese Patent Application No. 202210649286.0 filed on Jun. 10, 2022, and the contents of which are incorporated by reference herein in their entirety as part of the present application.

TECHNICAL FIELD

The disclosure relates to the technical field of image analysis in clinical medicine, in particular to a saline contrast electrical impedance lung perfusion and cardiac imaging image reconstruction and analysis method, system, device thereof, and computer-readable storage medium and application.

BACKGROUND

Electrical impedance tomography (EIT), as an advanced bedside noninvasive, continuous, dynamic and radiation-free pulmonary ventilation monitoring technology, mainly senses the changes of thoracic bioelectrical electrical impedance during ventilation by applying weak current through local electrodes, and then uses the corresponding imaging algorithm to monitor the pulmonary ventilation function state. In contrast enhancement methods by injecting high conductivity agent, saline contrast is common. It is mainly through injecting the contrast agent with high conductivity from the central venous catheter in the form of "bullet", in the process of contrast agent passing through right atrium, right ventricle and pulmonary vessels for the first time, the electrical impedance dilution curve of thoracic electrical impedance with time is obtained, and the distribution of lung perfusion is obtained by analysis. The applicant's team has carried out a series of clinical application research and development related to saline contrast EIT lung perfusion imaging.

SUMMARY

In a first aspect of the disclosure, a saline contrast lung perfusion image reconstruction method is provided, and includes:
  obtaining a patient saline contrast electrical impedance dilution curve;
  inputting the patient saline contrast electrical impedance dilution curve into a pre-trained deep learning model to generate a saline contrast-based reconstruction SPECT graph of a patient;
  where constructing the pre-trained deep learning model includes:
  obtaining the saline contrast electrical impedance dilution curve and the synchronous SPECT graph;
  generating a saline contrast-based reconstruction SPECT graph from the saline contrast electrical impedance dilution curve by using a deep learning model;
  calculating loss through generated saline contrast-based reconstruction SPECT graph and the synchronous SPECT image, back propagating, updating parameter, and obtaining a pre-trained deep learning model.

Further, the method also includes extracting multi-parameter features of the patient saline contrast electrical impedance dilution curve, inputting the extracted multi-parameter features of the patient saline contrast electrical impedance dilution curve into a pre-trained deep learn model, and generating a saline contrast-based reconstruction SPECT graph of the patient; optionally, the multi-parameter features include one or more of following features: a curve maximum impedance decline amplitude value, an area under the curve, a maximum slope, an average transmission time, and a thoracic morphology correction.

Further, the patient saline contrast electrical impedance dilution curve includes a patient saline contrast global impedance dilution curve, a patient saline contrast cardiac region impedance dilution curve and a patient saline contrast lung region impedance dilution curve.

Further, the deep learning model is DeepLab or unet, and optionally, the deep learning model is DeepLab V3.

Further, extracting the multi-parameter features of the patient saline contrast electrical impedance dilution curve is to extract the multi-parameter features of the patient saline contrast electrical impedance dilution curve by using one or more of XGBoost, SVM, logistic regression, random forest, GBDT, LightGBM or ANN algorithms; optionally, the method further includes extracting multi-parameter features of the patient saline contrast electrical impedance dilution curve, performing feature fusion on the multi-parameter features to obtain features after feature fusion, and inputting the features after feature fusion into a pre-trained deep learning model to generate a saline contrast-based reconstruction SPECT graph of the patient.

Further, the method also includes: generating a saline contrast EIT perfusion image from the patient saline contrast electrical impedance dilution curve, inputting the saline contrast EIT perfusion image into a pre-trained deep learn model, and generating a saline contrast-based reconstruction SPECT graph of the patient; optionally, constructing the pre-trained deep learning model includes:
  obtaining the saline contrast electrical impedance dilution curve and the synchronous SPECT graph;
  generating a saline contrast EIT perfusion image from the saline contrast electrical impedance dilution curve;
  generating a saline contrast-based reconstruction SPECT graph from the saline contrast EIT perfusion image by using a deep learning model;
  calculating loss through generated saline contrast-based reconstruction SPECT graph and the synchronous SPECT image, back propagating, updating parameter, and obtaining a pre-trained deep learning model.

Further, the saline contrast EIT perfusion image generated by the patient saline contrast electrical impedance dilution curve is to obtain the saline contrast EIT perfusion image by combining the patient saline contrast electrical impedance dilution curve with an image reconstruction algorithm; optionally, obtaining the patient saline contrast electrical impedance dilution curve, extracting the multi-parameter features of the patient saline contrast electrical impedance dilution curve, and obtaining the saline contrast EIT perfusion image by combineing with the image reconstruction algorithm.

In a second aspect of the disclosure, a pulsatile perfusion image reconstruction method is provided and includes:

obtaining a patient pulmonary vascular pulsatile graph;

obtaining patient synchronous saline contrast impedance dilution curves, and generating saline contrast-based lung perfusion images of a patient;

calculating a ratio of blood flow impedance data in the saline contrast-based lung perfusion image to pulsatile impedance data in the pulsatile graph or calculating a ratio of pixel points in the saline contrast-based lung perfusion image to pixel points in the pulsatile graph, to generate a correction factor;

generating a pulsatile perfusion image corrected by saline contrast based on the correction factor and the pulsatile graph.

Further, the saline contrast lung perfusion image is a lung perfusion image reconstructed by the saline contrast lung perfusion image reconstruction method or a lung perfusion image corrected by the saline contrast EIT graph.

Further, the correction factor is a correction factor of each of lung perfusion regions, and the lung perfusion regions are divided into different lung perfusion regions according to different dividing methods. Preferably, the correction factor is the correction factor of each of lung perfusion regions, the lung perfusion regions are divided into different lung perfusion regions according to different division methods; optionally, the lung perfusion regions include a right ventral side, a left ventral side, a right dorsal side and a left dorsal side; optionally, the lung perfusion regions also include ventral lateral side, ventral medial side, dorsomedial medial side and dorsomedial lateral side.

In a third aspect of the disclosure, a lung perfusion and regional V/Q non-invasive imaging method is provided, which includes:

obtaining a patient pulmonary vascular pulsatile graph;

generating a pulsatile perfusion image corrected by saline contrast based on the saline contrast pulsatile perfusion image reconstruction method;

obtaining a patient pulmonary ventilation graph;

constructing a pulmonary ventilation/blood flow graph by using the patient pulmonary ventilation graph and the pulsatile perfusion image corrected by saline contrast.

Further, constructing the pulmonary ventilation/blood flow graph is to use the patient pulmonary ventilation graph and the pulsatile perfusion image corrected by saline contrast with 20% of a maximum pixel point as a threshold value, to construct the pulmonary ventilation/blood flow graph.

Optionally, constructing a pulmonary ventilation/blood flow graph is to use the patient pulmonary ventilation graph, the pulsatile perfusion image corrected by saline contrast of the patient, and a cardiac output quantity and/or a minute ventilation.

Optionally, the patient pulmonary ventilation graph is a real-time pulmonary ventilation graph sequence, the pulsatile perfusion image corrected by saline contrast of the patient is a real-time pulsatile perfusion image sequence corrected by saline contrast of the patient, constructing a real-time pulmonary ventilation/blood flow graph sequence is to use the real-time pulmonary ventilation graph sequence and the real-time pulsatile perfusion image sequence corrected by saline contrast of the patient.

Further, the correction factor is a correction factor of each of lung perfusion regions, the lung perfusion regions are divided into different lung perfusion regions according to different dividing methods; optionally, the lung perfusion regions include right ventral side, left ventral side, right dorsal side and left dorsal side; optionally, the lung perfusion regions further include ventral lateral side, ventral medial side, dorsomedial medial side and dorsomedial lateral side.

In a fourth aspect of the disclosure, a right heart failure image analysis method based on saline contrast is provided, and includes:

obtaining patient EIT impedance signals, including impedance signals in ventilation stage and impedance signals in saline contrast stage;

performing low-pass filtering on the impedance signals in the ventilation stage to generate a lung area ROI graph;

performing band-pass filtering on the impedance signals in the ventilation stage to generate a heart area ROI graph;

calculating a difference value between a starting time of saline entering heart area ROI and a time of saline entering lung area ROI, based on impedance descend of heart area ROI and lung area ROI in a saline contrast stage;

outputting a classification result of whether the patient has right heart failure based on the difference value.

Further, calculating a difference value between a starting time of saline entering heart area ROI and a time of saline entering lung area ROI, based on impedance descend of heart area ROI and lung area ROI in a saline contrast stage specifically includes:

selecting a time when an impedance in the heart area ROI begins to decline as a starting time when saline enters the heart area, selecting a time when an impedance in the lung area ROI begins to decline as a time when saline enters the lung area, calculating the difference value between the starting time of saline entering the heart area ROI and the time of saline entering the lung area ROI.

Further, the method may further include:

obtaining patient EIT impedance signals, including impedance signals in ventilation stage and impedance signals in saline contrast stage;

performing low-pass filtering on the impedance signals in the ventilation stage to generate a lung area impedance curve;

performing band-pass filtering on the impedance signals in the ventilation stage to generate a heart area impedance curve;

selecting a time when an heart area impedance curve begins to decline as a starting time when saline enters the heart area, selecting a time when a lung area impedance curve begins to decline as a time when saline enters the lung area, calculating a difference value between a starting time of saline entering the heart area and a time of saline entering the lung area;

outputting a classification result of whether the patient has right heart failure based on the difference value.

Further, outputting a classification result of whether the patient has right heart failure based on the difference value specifically includes:

when a difference value interval exceeds a threshold, a classification result with right heart failure is output, and when a difference value interval is lower than the threshold, the classification result without right heart failure is output.

Further, performing low-pass filtering on the impedance signals in the ventilation stage to generate a lung area ROI graph specifically includes:

performing low-pass filtering on the impedance signals in the ventilation stage, and calculating the lung area ROI graph by using a standard deviation, where a calculation formula is as follows:

$$\delta_v = \sqrt{\frac{\sum (v_i - \hat{v})^2}{N}}$$

where $\delta v$ is a standard deviation of impedance signals change after low-pass filtering, vi is a change of signal at pixel point i in a period of time, $\hat{v}$ is an average value, and N is a number of frames in time.

Optionally, performing band-pass filtering on the impedance signal in the ventilation stage to generate a heart area ROI graph specifically includes:

performing band-pass filtering on the impedance signals in the ventilation stage, and calculating a heart area ROI graph by using a standard deviation, where a calculation formula is as follows:

$$\delta_q = \sqrt{\frac{\sum (q_i - \hat{q})^2}{N}}$$

where $\delta q$ is a standard deviation of impedance signal change after band-pass filtering, $q_i$ is a change of signal at pixel point i in a period of time, $\hat{q}$ is an average value, and N is a number of frames in time.

Further, the method may also include:
obtaining patient EIT impedance signals, including impedance signals in ventilation stage and impedance signals in saline contrast stage;
performing low-pass filtering on the impedance signals in the ventilation stage to generate a lung area ROI graph and a lung area impedance curve;
performing band-pass filtering on the impedance signals in the ventilation stage to generate a heart area ROI graph and a heart area impedance curve;
calculating a difference value between a starting time of saline entering the heart area ROI and a time of saline entering the lung area ROI as a first difference value based on an impedance descend of the heart area ROI and the lung area ROI in the saline contrast stage;
selecting a time when an heart area impedance curve begins to decline as a starting time (T0) when saline enters the heart area, selecting a time when a lung area impedance curve begins to decline as a time (T1) when saline enters the lung area, calculating a difference value between a starting time of saline entering the heart area and a time of saline entering the lung area, as a second difference value;
outputting a classification result of whether the patient has right heart failure based on the first difference value and the second difference value.

Further, a low-pass filter is used to perform low-pass filtering on the impedance signals in the ventilation stage to generate a lung area ROI graph, and a frequency of the low-pass filter is set to be lower than 50 per minute; optionally, a band-pass filter is used to perform band-pass filtering on the impedance signals in the ventilation stage to generate a heart area ROI graph, and a frequency of the band-pass filter is set to 50-200 per minute.

In a fifth aspect of the disclosure, an intracardiac shunt image analysis method is provided, and includes:
obtaining a patient saline contrast impedance curve;
obtaining an image sequence graph based on the saline contrast impedance curve, where the image sequence graph includes a right cardiac phase image sequence graph and/or a left cardiac phase image sequence graph;
extracting a central point of each image sequence graph and calculating a horizontal position relationship between the central point and a central point of the first sequence graph;
outputting a classification result of the patient intracardiac shunt.based on the positional relationship.

Further, the image sequence graph obtained based on the saline contrast impedance curve is an image sequence graph obtained by image reconstruction based on the saline contrast impedance curve, and the image reconstruction includes any one or more of following methods: projection reconstruction, light and dark shape restoration, stereo vision reconstruction and laser ranging reconstruction.

In some embodiments, the intracardiac shunt image analysis method further includes:
obtaining a patient saline contrast impedance curve;
obtaining a right cardiac phase image sequence graph based on the saline contrast impedance curve;
extracting a central point of each image sequence graph in the right cardiac image sequence graph, and calculating a horizontal position relationship between the central point and a central point of a first sequence graph in the right cardiac image sequence graph;
base on whether the positional relationship is left, outputting a classification result of whether the patient has intracardiac right-to-left shunt.

In some embodiments, the intracardiac shunt image analysis method further includes:
obtaining a patient saline contrast impedance curve;
obtaining a left cardiac phase image sequence graph based on the saline contrast impedance curve;
extracting a central point of each image sequence graph in the left cardiac phase image sequence graph, and calculating a horizontal position relationship between the central point and a central point of a first sequence graph in the left cardiac phase image sequence graph;
outputting a classification result of whether the patient has intracardiac left-to-right shunt base on whether the positional relationship is on right.

Further, the right cardiac phase image sequence graph is obtained by reconstructing the right ventricular blood flow contrast impedance curve in the saline contrast impedance curve in the T0-T1 time period; the left cardiac phase image sequence graph is obtained by reconstructing the left ventricular blood flow contrast impedance curve in the saline contrast impedance curve in the T2-T3 time period.

In an embodiment, the determination of the central point of the sequence graph is shown in the following formula:

$$CoH(t_k) = \sum (x_i \times f_i) / \sum f_i \times 100\%$$

where i belongs to the heart region H, $x_i$ is the abscissa of the pixel point i, $f_i$ is the best impedance decline slope of the least square fitting curve of the i-th pixel point, $CoH(t_k)$ represents the abscissa position of the heart center at $t_k$ moment, and $t_k$ is the k-th time window.

Furthermore, the heart region H is a pixel point whose impedance descend slope f is greater than $20\% \times f_{max}$, and $f_{max}$ is a slope of the pixel point with the largest slope, and the impedance descend slope f is calculated by the following formula:

$$\Delta z_i(t_k) = f_i t_k + e$$

where, $\Delta z_i(t_k)$ is the relative impedance value of $t_k$ time pixel point i, and e is the intercept.

An object of the disclosure is to provide a system including a computer program which, when executed by a processor, realizes the saline contrast lung perfusion image reconstruction method; or for executing the pulsatile perfusion image reconstruction method; or used for executing the lung perfusion and regional V/Q noninvasive imaging method; or for executing the right heart failure image analysis method; or for executing the intracardiac shunt image analysis method.

An object of the disclosure is to provide a device including a memory and a processor; the memory is used for storing program instructions; the processor is used for calling program instructions, and when the program instructions are executed, the processor is used for executing the saline contrast lung perfusion image reconstruction method; or for executing the pulsatile perfusion image reconstruction method; or used for executing the lung perfusion and regional V/Q noninvasive imaging method; or for executing the right heart failure image analysis method; or for executing the intracardiac shunt image analysis method.

The purpose of the disclosure is to provide a computer-readable storage medium on which a computer program is stored, and when the computer program is executed by a processor, the saline contrast lung perfusion image reconstruction method is realized; or for executing the pulsatile perfusion image reconstruction method; or used for executing the lung perfusion and regional V/Q non invasive imaging method; or for executing the right heart failure image analysis method; or for executing the intracardiac shunt image analysis method.

Advantages of the Disclosure

1. This disclosure innovatively discloses a method for reconstructing the saline contrast electrical impedance dilution curve took SPECT as the standard to obtain a saline contrast-based reconstruction SPECT graph. In addition, the disclosure also provides a better solution, that is, when the saline contrast EIT perfusion image is generated from the saline contrast electrical impedance dilution curve, the multi-parameter features of the patient saline contrast electrical impedance dilution curve are extracted to improve the accuracy of generating the saline contrast EIT perfusion image, and then the saline contrast EIT perfusion image is generated into a saline contrast-based reconstruction SPECT graph by using a deep learning model.

2. The disclosure innovatively introduces the forward blood flow impedance in the saline contrast through a correction factor, and generates a pulsatile perfusion image corrected by the saline contrast through image reconstruction, and the reconstructed pulsatile perfusion image corrected by the saline contrast includes both the pulsatile impedance data and the forward blood flow impedance data of the lung perfusion region, thus realizing the real-time and accurate generation of the lung perfusion image.

3. There is a big deviation in lung perfusion monitoring based on pulsatile method, which leads to a big deviation between lung perfusion and regional V/Q monitoring. In this disclosure, the forward blood flow impedance in saline contrast is introduced by a correction factor, and a pulsatile perfusion image corrected by saline contrast is generated through image reconstruction. The reconstructed pulsatile perfusion image corrected by saline contrast includes both pulsatile impedance data and forward blood flow impedance data of lung perfusion region, thus realizing real-time and accurate lung perfusion image generation, and further generating real-time and accurate lung perfusion and regional V/Q graph.

4. The disclosure innovatively discloses an image analysis method of right heart failure, which generates lung area and heart area ROI through low-pass filtering and band-pass filtering in ventilation stage, calculates the time difference of saline entering heart area and lung area based on the impedance descend of heart area ROI and lung area ROI in saline contrast stage, and by comparing the time difference of patient and the threshold of normal people, the diagnosis result of whether the patient has right heart failure is given.

The disclosure innovatively discloses an intracardiac shunt image analysis method based on saline contrast, which obtains a right cardiac phase image sequence graph and a left cardiac phase image sequence graph respectively through patient saline contrast impedance curves in T0-T1 period and T2-T3 period, and obtains a patient intracardiac shunt classification result based on the horizontal position relationship between the central point and the central point of the first sequence graph, thus objectively improving the accuracy and depth of data analysis.

BRIEF DESCRIPTION OF THE DRAWINGS

In order to more clearly explain the technical scheme in the embodiments of the disclosure, the drawings needed in the description of the embodiments will be briefly introduced below. Obviously, the drawings in the following description are only some embodiments of the disclosure. For those skilled in the art, other drawings can be obtained according to these drawings without creative work.

DETAILED DESCRIPTION OF THE EMBODIMENTS

In order to make those skilled in the technical field better understand the scheme of the disclosure, the technical scheme in the embodiment of the disclosure will be described clearly and completely with the attached drawings in the embodiment of the disclosure.

In some processes described in the specification and claims of the disclosure and the above drawings, multiple operations that appear in a specific order are included, but it should be clearly understood that these operations may be executed out of the order in which they appear here or in parallel. The sequence numbers of the operations, such as S101 and S102, are only used to distinguish different operations, and the sequence numbers themselves do not represent any execution order. In addition, these processes may include more or fewer operations, and these operations may be performed sequentially or in parallel.

In the following, the technical scheme in the embodiment of the disclosure will be clearly and completely described with reference to the attached drawings in the embodiment of the disclosure. Obviously, the described embodiment is only a part of the embodiment of the disclosure, but all of the embodiment. Based on the embodiments in the disclosure, all other embodiments obtained by those skilled in the art without creative efforts belong to the scope of protection of the disclosure.

The embodiment of the disclosure provides a system, a device and a computer-readable storage medium. Among them, the device can be a terminal or a server. The terminal can be a smart phone, a tablet computer, a notebook computer, a PersonalComputer (PC) and other terminal devices. The server can be an independent physical server, can also be a server cluster or a distributed system composed of multiple physical servers, and can also be a cloud server that provides basic cloud computing services such as cloud service, cloud database, cloud computing, cloud storage, network service, cloud communication, middleware service, domain name service, security service, ContentDeliveryNetwork (CDN), big data and artificial intelligence platform. The terminal and the server can be directly or indirectly connected through wired or wireless communication, and the disclosure is not limited here.

Figure 1:
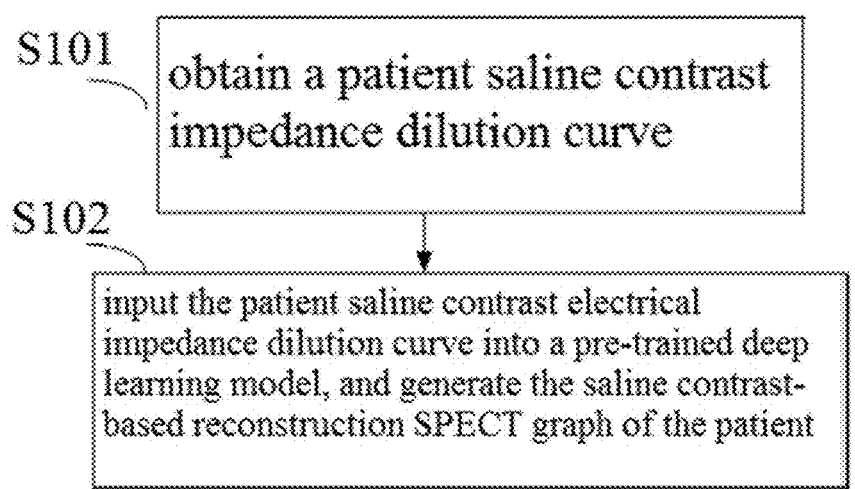
FIG. 1 is a schematic flow chart of a saline contrast lung perfusion image reconstruction method according to embodiments of the disclosure.

FIG. 1 is a schematic flow chart of a saline contrast lung perfusion image reconstruction method according to embodiments of the disclosure, specifically including the following steps:

S101: a patient saline contrast electrical impedance dilution curve is obtained.

In one embodiment, the patient saline contrast impedance dilution curve includes a patient saline contrast global impedance dilution curve, a patient saline contrast cardiac region impedance dilution curve and a patient saline contrast pulmonary region impedance dilution curve. In a specific embodiment, a patient saline contrast lung perfusion region impedance dilution curve is obtain, and the lung perfusion regions are divided into different sub-lung perfusion region according to different dividing methods. Optionally, the sub-lung perfusion region includes a right ventral side, a left ventral side, a right dorsal side and a left dorsal side. Optionally, the sub-lung perfusion region also includes ventral lateral side, ventral medial side, dorsomedial medial side and dorsomedial lateral side. Optionally, the lung perfusion regions can be divided into 1024(32×32 array moments) regions (pixel points).

In one embodiment, the method for obtaining the patient saline contrast electrical impedance dilution curve is as follows: firstly, breath holding test is required for at least 8 seconds (when the ventilator is mechanically ventilated, it should be properly sedated first, the ventilator is adjusted to completely control the ventilation mode, and the Breath-out or Breath-in Hold button is pressed for 10 s; patients with spontaneous breathing are told to hold their breath for 8 seconds). After the breath-holding test is passed, the saline contrast EIT examination can be performed. Then, the patient connects the pulmonary electrical impedance monitoring instrument and prepares 10 ml of 10% NaCl to confirm that the patient has established a central venous catheter (either internal jugular vein or subclavian vein catheter). Saline injection: generally, two operators are required to complete it together, and one of them sends out the instruction to inject saline while confirming that the EIT machine is working normally and starting the patient to hold his breath; Another operator immediately injected 10 ml of 10% NaCl into the patient from the central venous catheter after receiving the confirmation instruction; During the whole operation, EIT monitor starts recording mode, and continuously collects chest electrical impedance signal data 2 minutes before saline injection. The whole process requires at least 5 minutes, and completely records the process of lung resistance decline caused by saline injection during breath holding. Then, the patient is connected the pulmonary electrical impedance monitoring instrument and 10 ml of 10% NaCl is prepared to confirm that the patient has established a central venous catheter (either internal jugular vein or subclavian vein catheter). Saline injection: generally, two operators are required to complete it together, and one of them sends out the instruction to inject saline while confirming that the EIT machine is working normally and starting the patient to hold his breath. Another operator immediately injected 10 ml of 10% NaCl into the patient from the internal jugular vein catheter after receiving the confirmation instruction. During the whole operation, EIT monitor starts recording mode, and chest electrical impedance signal data is continuously collected for 2 minutes before saline injection. The whole process requires at least 5 minutes, and the process of lung resistance decline caused by saline injection is completely recorded during breath holding. During breath holding, the whole resistance curve begins to decline as the starting point (T0) for saline to enter the body, and after one dynamic cycle, it is the starting point (T1) for saline to enter the pulmonary vessels, and the lowest point of the whole resistance is the end point (T2) for saline to pass through the pulmonary vessels. The resistance curve in T0-T1 period reflects that saline enters the right heart, but does not reflect pulmonary vascular perfusion. The saline contrast EIT lung perfusion image is constructed by using the resistance-time variation curve (maximum slope fitting) of each lung region in T1-T2 time period.

S102: the patient saline contrast electrical impedance dilution curve is input into a pre-trained deep learning model to generate a saline contrast-based reconstruction SPECT graph of a patient.

In one embodiment, constructing the pre-trained deep learning model includes:
the saline contrast electrical impedance dilution curve and the synchronous SPECT graph are obtained;
a saline contrast-based reconstruction SPECT graph is generated from the saline contrast electrical impedance dilution curve by using a deep learning model;
loss is calculated through generated saline contrast-based reconstruction SPECT graph and the synchronous SPECT image, back propagating is performed, parameter is updated, and a pre-trained deep learning model is obtained.

In one embodiment, the method also includes: multi-parameter features of the patient saline contrast electrical impedance dilution curve are extracted, the extracted multi-parameter features of the patient saline contrast electrical impedance dilution curve are input into a pre-trained deep learn model, and a saline contrast-based reconstruction SPECT graph of the patient is generated.

In one embodiment, the method for obtaining the synchronous SPECT graph includes: firstly, Xe radioactive gas in a closed system is breathed for lung ventilation imaging, then lung blood flow imaging is performed through intravenous injection of technetium 99 polymeric protein, and SPECT tomographic image with ventilation and perfusion in the same plane as EIT (4th-5th intercostal space) is selected through SPECT images through a multi-probe r camera, so as to serve as training targets.

In one embodiment, a deep learning model is adopted to generate a saline contrast-based reconstruction SPECT graph from the saline contrast electrical impedance dilution curve to extract multi-parameter features of the saline contrast electrical impedance dilution curve. A deep learning model is used to generate a saline contrast-based reconstruction SPECT graph by extracting the multi-parameter features of the saline contrast electrical impedance dilution curve.

Figure 8:
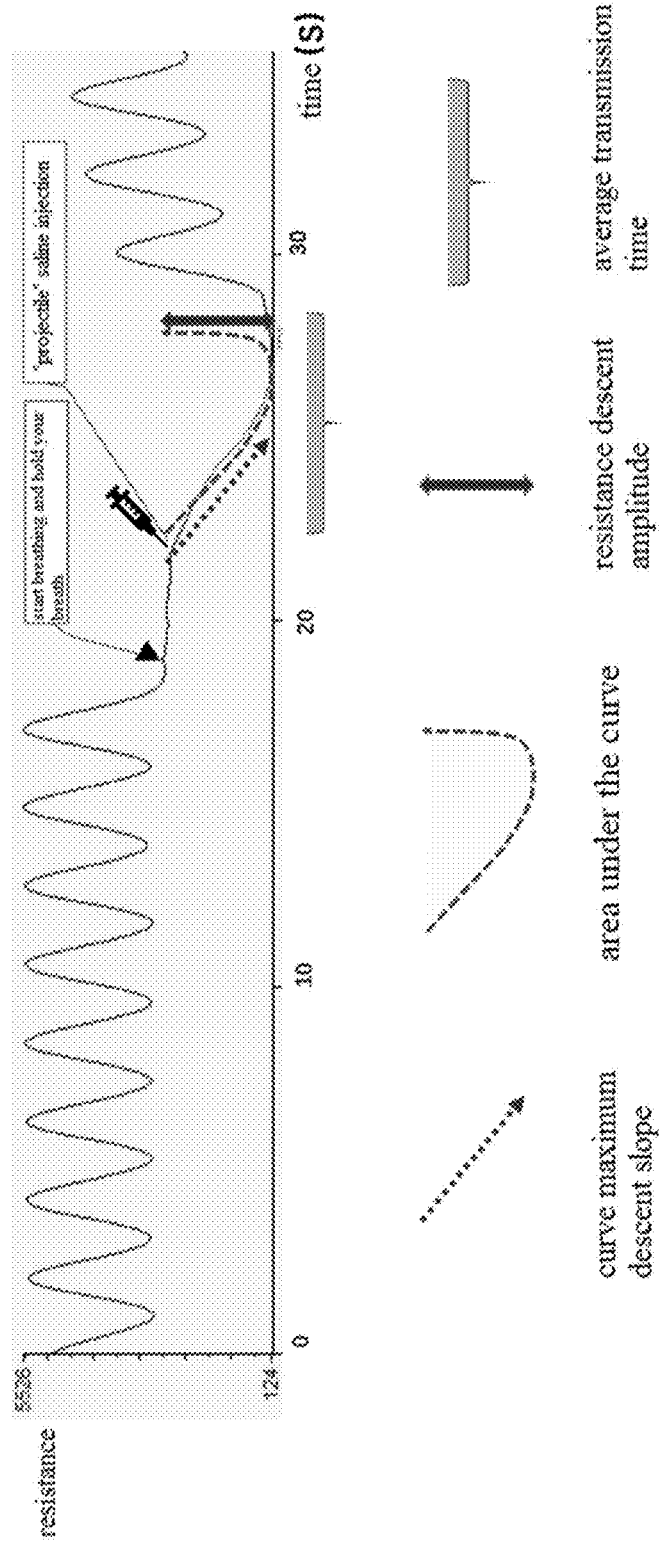
FIG. 8 is a diagram showing the main feature parameters of lung regional perfusion reflected by the saline contrast lung electrical impedance dilution time curve according to embodiments of the disclosure.

In one embodiment, the multi-parameter features include one or more of the following features: the curve maximum impedance decline amplitude value, the area under the curve, the maximum slope, the average transmission time, and the thoracic morphology correction. Considering that the current EIT image mainly simulates the forward model by the default elliptical contour features, and calculates the information distribution of relative impedance by estimating the electrode position and current distribution, but there are individual differences in the chest of each patient, it is proposed to correct the chest shape by measuring the chest anteroposterior diameter, maximum transverse diameter and chest circumference of EIT monitoring fault. Preferably, the multi-parameter features include one or more of the following features: the curve maximum impedance decline amplitude value, the area under the curve, the maximum slope, the average transmission time, and the thoracic morphology correction. The curve maximum impedance decline amplitude value is also called the electrical impedance decline amplitude value, and the maximum slope is also called the curve maximum decline slope. See FIG. 8 for details.

In one embodiment, the deep learning model is DeepLab or unet, and more preferably, the deep learning model is DeepLab V3.

In one embodiment, extracting the multi-parameter features of the patient saline contrast electrical impedance dilution curve is extracting the multi-parameter features of the patient saline contrast electrical impedance dilution curve by using a machine learning algorithm. Optionally, extracting the multi-parameter features of the patient saline contrast electrical impedance dilution curve is extracting the multi-parameter features of the patient saline contrast electrical impedance dilution curve by using one or more of XGBoost, SVM, logistic regression, random forest, GBDT, LightGBM or ANN algorithms.

In one embodiment, the method further includes: multi-parameter features of the patient saline contrast electrical impedance dilution curve are extracted, feature fusion is performed on the multi-parameter features to obtain features after feature fusion, and the features after feature fusion are input into a pre-trained deep learning model to generate a SPECT graph of the patient saline contrast-based reconstruction.

In one embodiment, the patient saline contrast electrical impedance dilution curve is obtained, the patient saline contrast electrical impedance dilution curve is generated into a saline contrast EIT perfusion image, and the saline contrast EIT perfusion image is input into a pre-trained deep learning model to generate the patient saline contrast-based reconstruction SPECT graph.

In one embodiment, the pre-trained deep learning model is constructed by the following methods:
the saline contrast electrical impedance dilution curve and the synchronous SPECT graph are obtained;
a saline contrast EIT perfusion image is generated from the saline contrast electrical impedance dilution curve;
a deep learning model is used to generate a saline contrast-based reconstruction SPECT graph from the saline contrast EIT perfusion image;
loss is calculated through the generate the saline contrast-based reconstruction SPECT graph and the synchronous SPECT image, back propagating is performed, parameter is updated, and a pre-trained deep learning model is obtained.

In one embodiment, generating a saline contrast EIT perfusion image form the patient saline contrast electrical impedance dilution curve is obtaining saline contrast EIT perfusion image by combining the patient saline contrast electrical impedance dilution curve with an image reconstruction algorithm. Optionally, the saline contrast EIT perfusion image is obtained by combining the patient saline contrast electrical impedance dilution curve with the maximum slope method.

In one embodiment, the patient saline contrast electrical resistance dilution curve is obtained, the multi-parameter features of the patient saline contrast electrical resistance dilution curve are extracted, and the saline contrast EIT perfusion image is obtained by combining an image reconstruction algorithm. Optionally, the multi-parameter features include one or more of the following features: the curve maximum decline slope, the area under the curve, the average transmission time and the electrical impedance decline amplitude.

In a specific embodiment, a patient saline contrast electrical impedance dilution curve is obtained, the patient saline contrast electrical impedance dilution curve is combined with a traditional image reconstruction algorithm to generate a saline contrast EIT perfusion image, and the saline contrast EIT perfusion image is input into a pre-trained deep learning model to generate a saline contrast-based reconstruction SPECT image of the patient. The pre-trained deep learning model is constructed by the following methods: the saline contrast electrical impedance dilution curve and the synchronous SPECT graph are obtaining; the saline contrast electrical impedance dilution curve is combined with a traditional image reconstruction algorithm to generate a saline contrast EIT perfusion image; a deep learning model is used to generate a saline contrast-based reconstruction SPECT graph from the saline contrast EIT perfusion image; loss is calculated through the generate saline contrast-based reconstruction SPECT graph and the synchronous SPECT image, back propagating is performed, parameter is updated, and a pre-trained deep learning model is obtained.

In one embodiment, the patient saline contrast electrical impedance dilution curve is obtained, the multi-parameter features of the patient saline contrast electrical impedance dilution curve are extracted, the saline contrast EIT perfusion image is obtained by combining with an image reconstruction algorithm, and the saline contrast EIT perfusion image is input into a pre-trained deep learning model to generate the patient saline contrast-based reconstruction SPECT graph. The pre-trained deep learning model is constructed by the following methods: the saline contrast electrical impedance dilution curve and the synchronous SPECT graph are obtained; the multi-parameter features of the patient saline contrast electrical impedance dilution curve are extracted, and an image reconstruction algorithm is combined to obtain a saline contrast EIT perfusion image. a deep learning model is used to generate a saline contrast-based reconstruction SPECT graph from the saline contrast EIT perfusion image. loss is calculated through the generate the saline contrast-based reconstruction SPECT graph and the synchronous SPECT image, back propagating is performed, parameter is update, and a pre-trained deep learning model is obtained. The saline contrast EIT perfusion image based on multi-parameter features is a more accurate image to reflect lung perfusion. In a specific embodiment, the multi-parameter features include one or more of the following features: the curve maximum impedance decline amplitude value, the area under the curve, the maximum slope, the average transmission time, and the thoracic shape correction. Considering that the current EIT image mainly simulates the forward model by the default elliptical contour features, and calculates the information distribution of relative impedance by estimating the electrode position and current distribution, but there are individual differences in the chest of each patient, it is proposed to optimize the simulated forward model by measuring the chest anteroposterior diameter, maximum transverse diameter and chest circumference of EIT monitoring fault. Preferably, the multi-parameter features include one or more of the following features: the curve maximum impedance decline amplitude value, the curve lower are, the maximum slope, the average transmission time, and the thoracic morphology correction.

Figure 7:
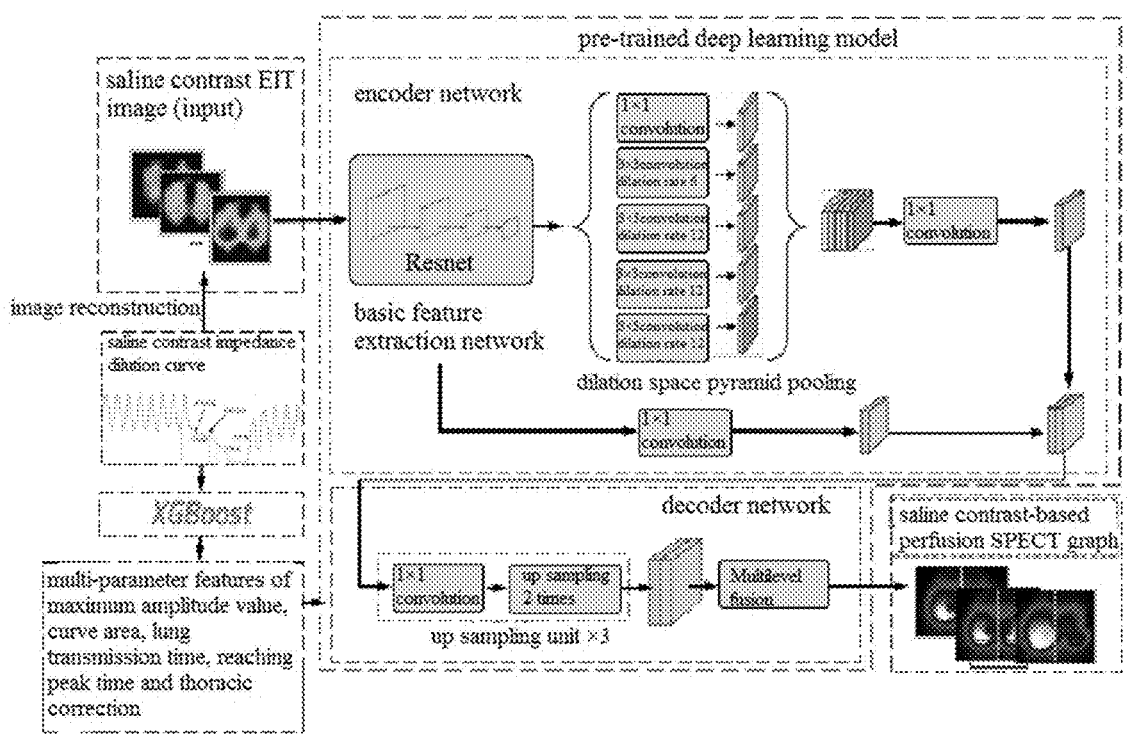
FIG. 7 is a schematic diagram of the process of generating SPECT graph reconstructed by saline contrast from saline contrast impedance dilution curve according to embodiments of the disclosure.

In one embodiment, as shown in FIG. 7, the patient saline contrast electrical impedance dilution curve is obtained, the multi-parameter features of the patient saline contrast electrical impedance dilution curve are extracted by XGBoost algorithm, the saline contrast EIT perfusion image is obtained by combining with the image reconstruction algorithm, the saline contrast EIT perfusion image is input into a pre-trained deep learning model, and the extracted multi-parameter features of the patient saline contrast electrical impedance dilution curve are fused to generate the patient saline contrast-based reconstruction SPECT graph, and the deep learning model is DeepLab.

Figure 2:
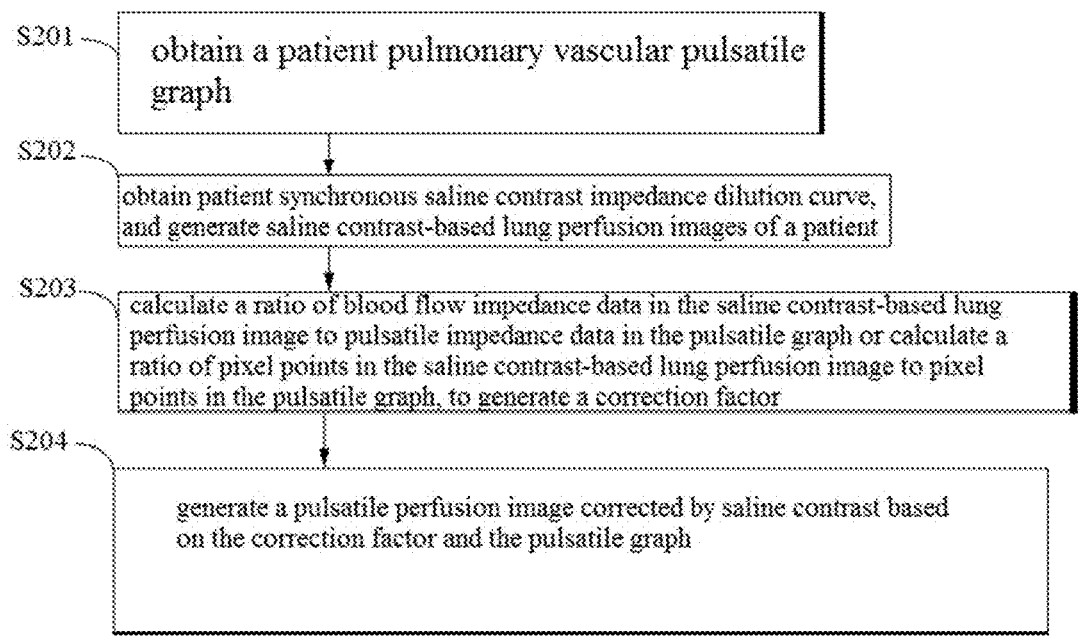
FIG. 2 is a schematic flow chart of a pulsatile perfusion image reconstruction method according to embodiments of the disclosure.

FIG. 2 is a schematic flow chart of a pulsatile perfusion image reconstruction method according to embodiments of the disclosure, specifically including the following steps:
S201: a patient pulmonary vascular pulsatile graph is obtained;
S202: patient synchronous saline contrast impedance dilution curves are obtained, and saline contrast-based lung perfusion images of a patient are generated;
S203: a ratio of blood flow impedance data in the saline contrast-based lung perfusion image to pulsatile impedance data in the pulsatile graph is calculated or a ratio of pixel points in the saline contrast-based lung perfusion image to pixel points in the pulsatile graph is calculated to generate a correction factor;

S204: a pulsatile perfusion image corrected by saline contrast is generated based on the correction factor and the pulsatile graph.

In one embodiment, obtaining a patient pulmonary vascular pulsatile graph is obtaining a pulsatile graph for acquiring the patient band-pass filtering electrical impedance curve to generate a pulsatile graph. Specifically, the method for obtaining the patient band-pass filtering electrical impedance curve is as follows: signals below 0.67 HZ (40 beats/min) and above 2.67 HZ (160 beats/min) are filtered through frequency domain filtering technology, which is equivalent to filtering impedance change signals caused by tidal breathing, and only retaining pulsatile impedance signals related to heart beat. In this way, the separation of ventilation related signals and heart beat related signals is realized, and the impedance curve of heart beat signals is obtained.

In one embodiment, the method for generating the pulsatile graph by band-pass filtering electrical impedance curve specifically includes the following steps: the heart-related pulsatile impedance curve of each region (pixel point) is obtained through the above-mentioned filtering technology, and the perfusion blood flow of the pixel point (region) is reflected by the intensity of pulsatile impedance signal of each pixel point (the amplitude of each pulsatile impedance and the area under each pulsatile impedance curve). If the pulsatile impedance is strong, it indicates that the perfusion volume of this region is large, and accordingly, the pulsatile image related to perfusion is further constructed by the intensity of pulsatile impedance of each pixel point. The lung perfusion region is divided into different sub-lung perfusion regions according to different dividing methods.

Optionally, the sub-lung perfusion region includes a right ventral side, a left ventral side, a right dorsal side and a left dorsal side. Optionally, the sub-lung perfusion region also includes ventral lateral side, ventral medial side, dorsomedial medial side and dorsomedial lateral side. Optionally, the lung perfusion region can be divided into 1024(32×32 array moments) regions (pixel points).

In one embodiment, the saline contrast lung perfusion image is a lung perfusion image reconstructed by the saline contrast lung perfusion image reconstruction method or a lung perfusion image corrected by the saline contrast EIT graph.

In one embodiment, the pulsatile perfusion image corrected by saline contrast is a SPECT graph reconstructed by saline contrast or an EIT lung perfusion image by saline contrast. Specifically, when the correction factor is the ratio of saline contrast EIT lung perfusion image pixel points to the pulsatile image pixel points, the generated correction factor is to generate a pulsatile perfusion image corrected by saline contrast based on the correction factor and the pulsatile graph. When the correction factor is the ratio of SPECT image pixel points reconstructed based on saline contrast to the pulsatile image pixel points, the generated correction factor is to generate a saline contrast reconstruction SPECT image based on the correction factor and the pulsatile graph.

In one embodiment, the correction factor is the correction factor of each lung perfusion region, the lung perfusion regions are divided into different lung perfusion regions according to different dividing methods. Optionally, the lung perfusion regions include a right ventral side, a left ventral side, a right dorsal side and a left dorsal side; Optionally, the lung perfusion region also includes ventral lateral side, ventral medial side, dorsomedial medial side and dorsomedial lateral side.

Figure 9:
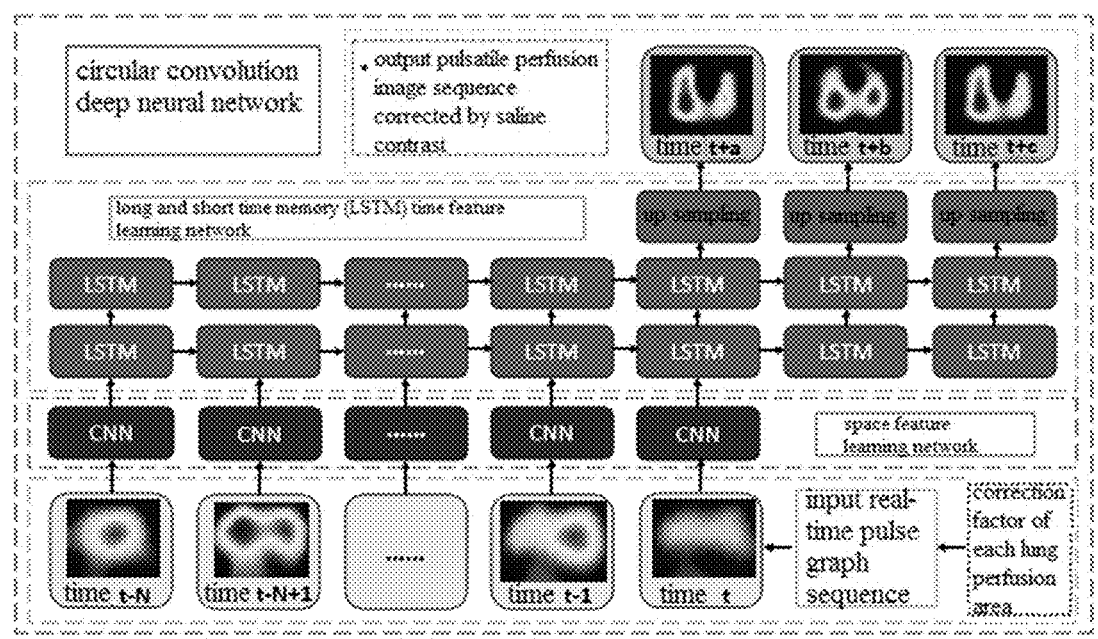
FIG. 9 is a schematic process diagram of a pulsatile perfusion image reconstruction method corrected by saline contrast according to embodiments of the disclosure.

In one embodiment, the pulsatile graph is a real-time pulsatile graph sequence, and the pulsatile perfusion image corrected by saline contrast is a real-time pulsatile perfusion images sequence corrected by saline contrast. In a specific embodiment, as shown in FIG. 9, a circular convolution depth neural network is used to generate and output a pulsatile perfusion image sequence corrected by saline contrast based on the pulsatile graph sequence obtained in real time.

Figure 3:
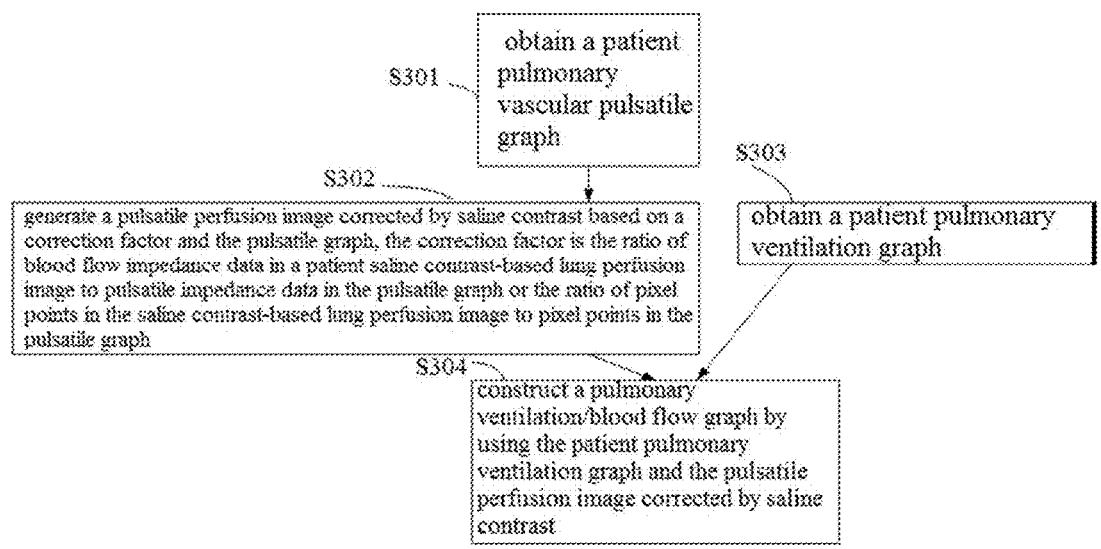
FIG. 3 is a schematic flow chart of lung perfusion and regional V/Q noninvasive imaging method according to embodiments of the disclosure.

FIG. 3 is a schematic flow chart of lung perfusion and regional V/Q noninvasive imaging method according to embodiments of the disclosure, specifically including the following steps:

S301: a patient pulmonary vascular pulsatile graph is obtained;

S302: a pulsatile perfusion image corrected by saline contrast is generated based on a correction factor and the pulsatile graph, where the correction factor is the ratio of blood flow impedance data in a patient saline contrast-based lung perfusion image to pulsatile impedance data in the pulsatile graph or the ratio of pixel points in the saline contrast-based lung perfusion image to pixel points in the pulsatile graph;

a patient pulmonary ventilation graph is obtained;

a pulmonary ventilation/blood flow graph is constructed by using the patient pulmonary ventilation graph and the pulsatile perfusion image corrected by saline contrast.

In one embodiment, the saline contrast-corrected pulsatile perfusion image generated based on the correction factor and the pulsatile graph adopts the saline contrast pulsatile perfusion image reconstruction method in FIG. 2 to generate the saline contrast-corrected pulsatile perfusion image.

In one embodiment, constructing the pulmonary ventilation/blood flow graph is to use the patient pulmonary ventilation graph and the pulsatile perfusion image corrected by saline contrast with 20% of a maximum pixel point as a threshold value, to construct the pulmonary ventilation/blood flow graph. Optionally, constructing a pulmonary ventilation/blood flow graph is to use the patient pulmonary ventilation graph, the pulsatile perfusion image corrected by saline contrast of the patient, and a cardiac output quantity and/or a minute ventilation.

In one embodiment, the patient pulmonary ventilation graph is a real-time pulmonary ventilation graph sequence, the pulsatile perfusion image corrected by saline contrast of the patient is a real-time pulsatile perfusion image sequence corrected by saline contrast of the patient, constructing a real-time pulmonary ventilation/blood flow graph sequence is to use the real-time pulmonary ventilation graph sequence and the real-time pulsatile perfusion image sequence corrected by saline contrast of the patient.

Figure 10:
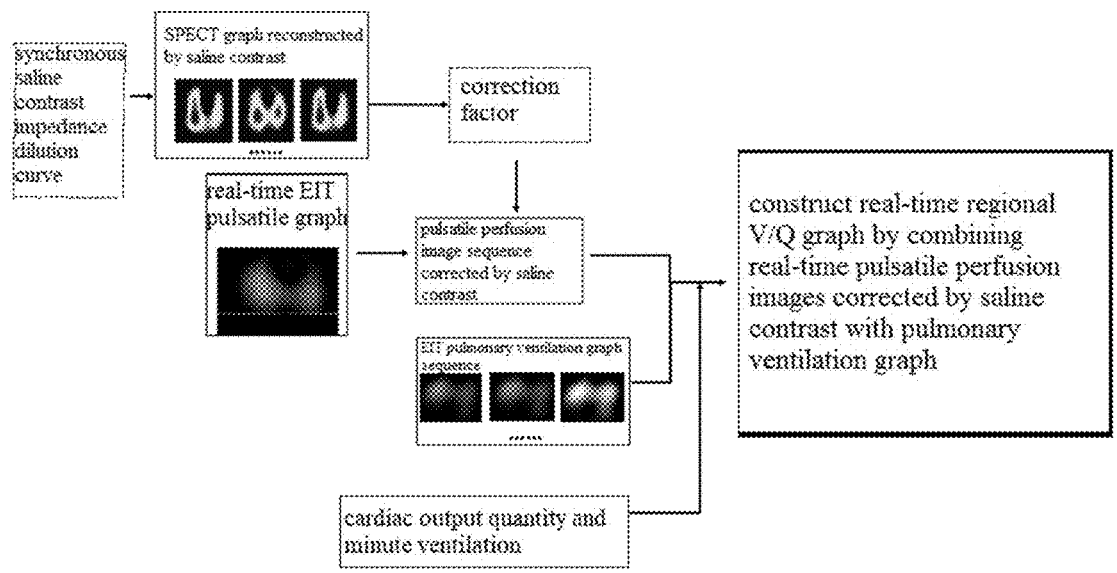
FIG. 10 is a schematic process diagram of lung perfusion and regional V/Q noninvasive imaging method according to embodiments of the disclosure.

In a specific embodiment, as shown in FIG. 10, a real-time pulmonary ventilation graph and a band-pass filter electrical impedance curve of a patient are respectively obtained to generate a pulsatile graph, a real-time pulsatile perfusion image corrected by saline contrast is generated based on a correction factor and the pulsatile graph, and a real-time pulmonary ventilation/blood flow graph is constructed by using the real-time pulmonary ventilation graph of the patient and the real-time pulsatile perfusion image corrected by saline contrast. Preferably, when constructing the real-time pulmonary ventilation/blood flow graph, cardiac output quantity and/or minute ventilation are introduced to further improve and obtain the optimized real-time pulmonary ventilation/blood flow graph.

Figure 4:
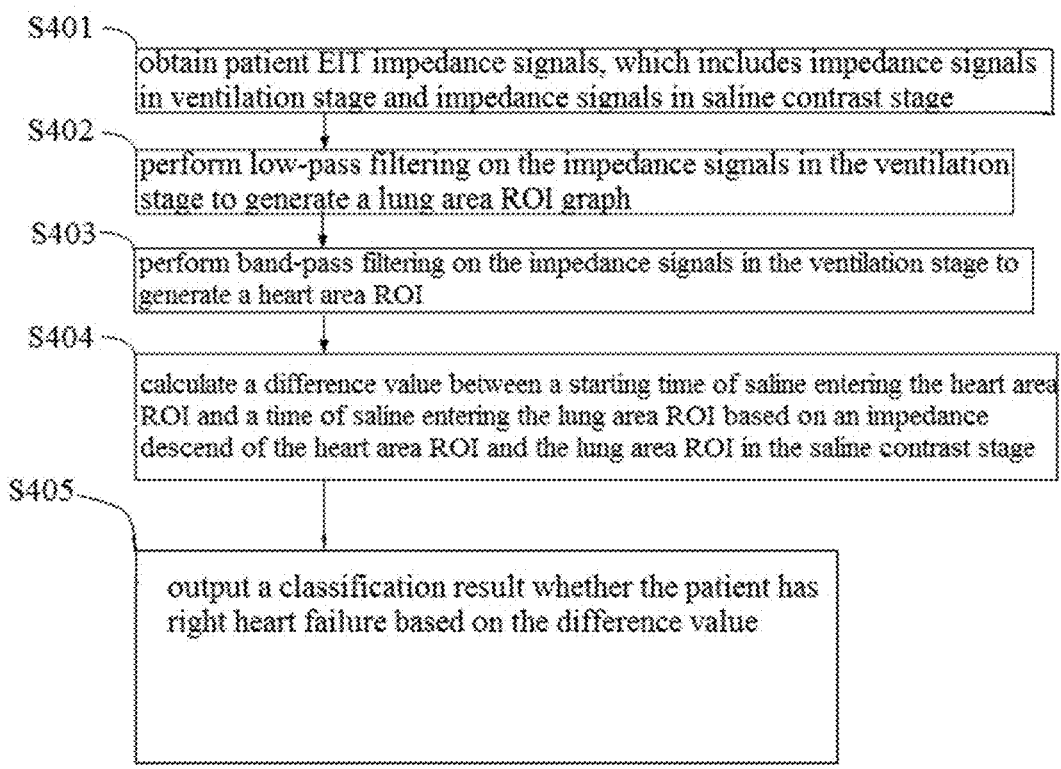
FIG. 4 is a schematic flow chart of right heart failure image analysis method according to embodiments of the disclosure.

FIG. 4 is a schematic flow chart of right heart failure image analysis method according to embodiments of the disclosure, specifically including the following steps:

S401: patient EIT impedance signals are obtained, which includes impedance signals in ventilation stage and impedance signals in saline contrast stage.

In one embodiment, before starting the contrast agent injection, the doctor sets the ventilator to end-expiratory breath holding state for a period of time. During this period, 10 mL of hypertonic saline with 10% concentration is injected through the superior vena cava immediately, and the impedance change of EIT is observed. Immediately after that, mechanical ventilation is resumed. In the mechanical ventilation stage, the impedance signal of ventilation stage is collected, and the impedance signal of saline contrast stage is collected at the time of injecting saline after the end-expiratory breath holding state.

In a specific embodiment, the obtained patient saline contrast EIT impedance signal adopts the following steps.

Step 1, breath hold test is performed, and the time between right heart and lung phase is required to be at least 8 seconds. Due to the influence of cardiopulmonary transmission time, in order to better construct left cardiac phase imaging, the time is required to be at least 15 seconds, and the breath holding time is further extended if necessary.

Step 2, saline is injected for blood flow contrast of ventricle, and the changes of chest electrical impedance signals are continuously collected during breath holding.

Further, the specific operation of step 1 is as follows: breath holding test is performed, which requires at least 8 seconds (when the ventilator is mechanically ventilated, your breath is held for 8 seconds by exhaling or inhaling; patients with spontaneous breathing are told to hold their breath for 8 seconds). After the breath-holding test is passed, the EIT examination of saline contrast can be performed. Among them, the concentration of injected saline is 10% and the injection amount is 10 ml.

Further, the specific operation of step 2 is as follows: the subject is connected the pulmonary electrical impedance monitoring instrument, 10 ml of 10% NaCl 10 ml is prepared and it is confirmed that the subject has established a central venous catheter. One second after holding breath, 10 ml of 10% NaCl is simultaneously and rapidly injected from the central venous catheter into the body for pulmonary perfusion imaging. During this period, the changes of chest electrical impedance signals are continuously collected.

Based on the total relative impedance-time curve in the patient's chest during the whole process, the impedance curve can be constructed. Those skilled in the art can obviously divide the impedance into three parts, namely ventilation-end-expiratory breath holding-ventilation, and then get the impedance signal in the ventilation stage and the impedance signal in the saline contrast stage.

S402: low-pass filtering is performed on the impedance signals in the ventilation stage to generate a lung area ROI graph.

In one embodiment, low-pass filtering is performed on the impedance signals in the ventilation stage, and the lung area ROI graph is calculated by using a standard deviation, where a calculation formula is as follows:

$$\delta_v = \sqrt{\frac{\sum (v_i - \hat{v})^2}{N}}$$

where δv is a standard deviation of impedance signals change after low-pass filtering, vi is a change of signal at pixel point i in a period of time, $\hat{v}$ is an average value, and N is a number of frames in time.

Figure 11A:
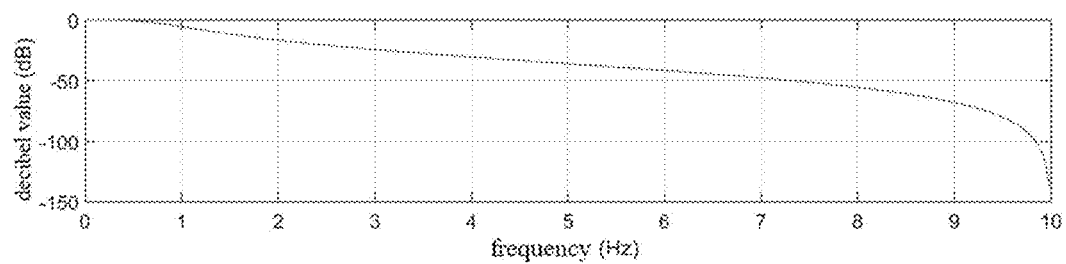
FIG. 11A is a corresponding spectrum diagram of a low-pass filter according to embodiments of the disclosure at some frequencies.
Figure 11B:
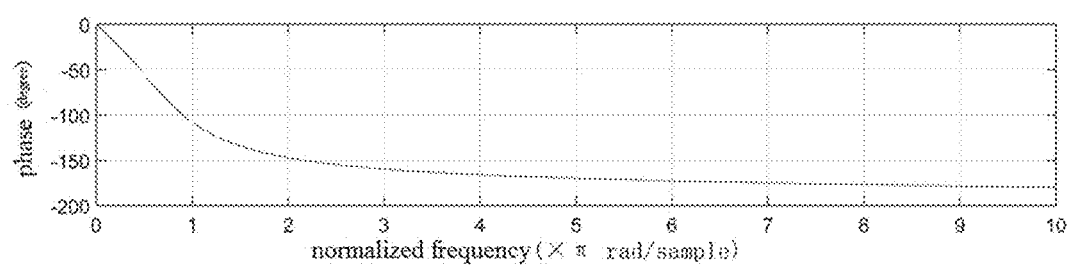
FIG. 11B is a corresponding spectrum diagram of a low-pass filter according to embodiments of the disclosure at normalized frequencies.

In one embodiment, a low-pass filter is used to low-pass filter the impedance signal of the ventilation stage to generate a lung area ROI graph, and the frequency of the low-pass filter is set to be lower than 50 per minute. Specifically, the third-order butterworth filter is used to separate respiratory related signals, and the frequency of the low-pass filter is set to 50 per minute (~0.83 Hz). See FIG. 11A and FIG. 11B for the corresponding frequency spectrum of the low-pass filter.

S403: band-pass filtering is performed on the impedance signals in the ventilation stage to generate a heart area ROI graph.

In one embodiment, band-pass filtering is performed on the impedance signals in the ventilation stage, and a heart area ROI graph is calculated by using a standard deviation, where a calculation formula is as follows:

$$\delta_q = \sqrt{\frac{\sum (q_i - \hat{q})^2}{N}}$$

where δq is a standard deviation of impedance signal change after band-pass filtering, $q_i$ is a change of signal at pixel point i in a period of time, $\hat{q}$ is an average value, and N is a number of frames in time.

Figure 12A:
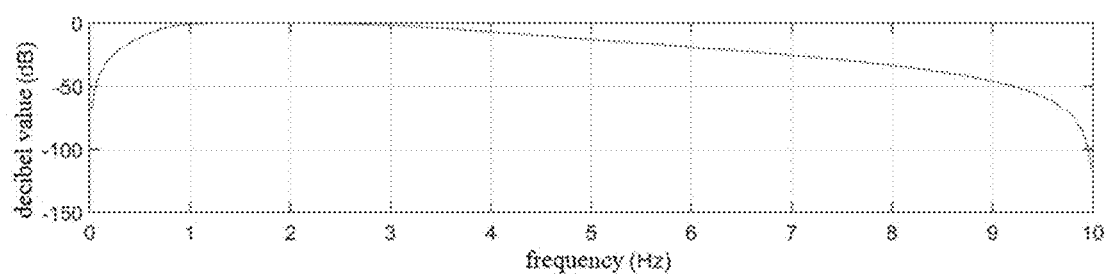
FIG. 12A is a corresponding spectrum diagram of a band-pass filter according to embodiments of the disclosure at some frequencies.
Figure 12B:
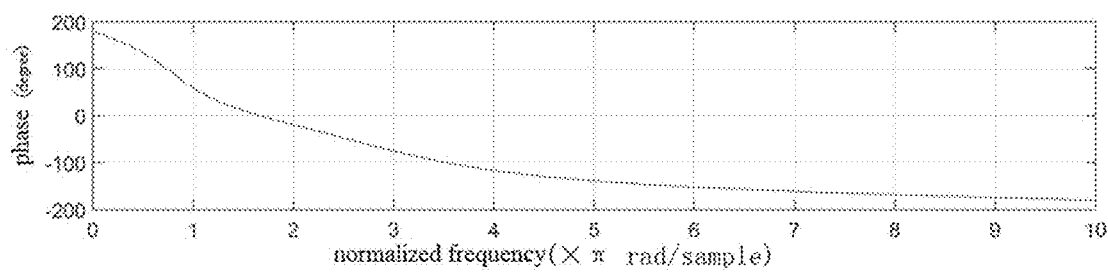
FIG. 12B is a corresponding spectrum diagram of a band-pass filter according to embodiments of the disclosure at normalized frequencies.

In one embodiment, a 3rd-order butterworth filter is used to separate heartbeat-related signals, and the frequency of the band-pass filter is set to 50 per minute and 200 per minute, [0.83 Hz, 3.33 Hz]. See FIG. 12A and FIG. 12B for the corresponding frequency spectrum graph of the band-pass filter.

Figure 13:
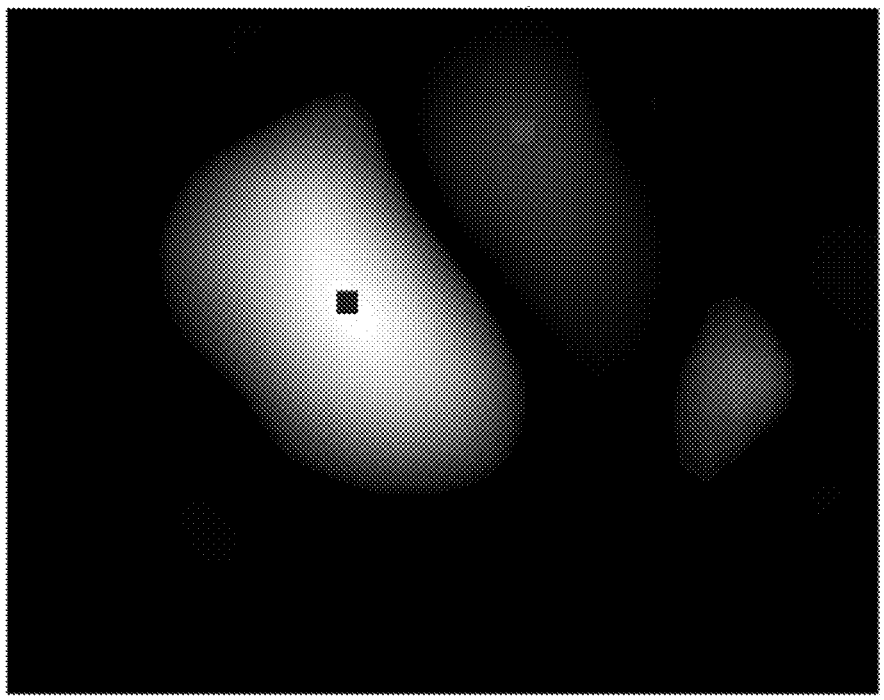
FIG. 13 is a low-pass filter and a band-pass filter to generate lung area ROI and heart area ROI according to embodiments of the disclosure, where the points of lung area and heart area are respectively positioned as the pixels with the maximum value in the corresponding ventilation and heartbeat standard deviation diagrams.

In a specific embodiment, the lung area and the heart area are determined by the above method, and the points in FIG. 13 are respectively located as the pixel points with the maximum value in the corresponding ventilation and heartbeat standard deviation graphs.

S404: a difference value between a starting time of saline entering the heart area ROI and a time of saline entering the lung area ROI is calculated based on an impedance descend of the heart area ROI and the lung area ROI in the saline contrast stage.

In one embodiment, the impedance of ROI in the heart area starting to decrease is selected as the starting time (T0) of saline entering the heart area, and the impedance of ROI in the lung area starting to decrease is selected as the time (T1) of saline entering the lung area, and the difference value between the starting time of saline entering the heart area ROI and the time of saline entering the lung area ROI is calculated.

In a specific embodiment, the specific construction of the right cardiac phase graph in the saline contrast stage is as follows: the overall resistance curve beginning to decline during breath holding as the starting point (T0) of saline entering the heart, and the impedance of a certain ROI lung area beginning to decline is selected as the time point (T1) when saline enters the pulmonary vessels and reaches the lung area. Therefore, the resistance curve in the time period from T0 to T1 mainly reflects that saline mainly enters the right heart gathering period, and the slope is calculated by using the resistance-time change curve in the time period from T0 to T1 to construct right cardiac imaging. The slope calculation window of the resistance-time curve is 0.5 seconds, and the step size is 0.5 seconds to analyze the right phase graph constructed in each 0.5 second window in the period from T0 to T1.

More specifically, the calculation of the optimal slope of the i-th pixel point in the right cardiac phase sequence graph is obtained by the formula for calculating the perfusion volume of the i-th pixel point:

$$\Delta z_i(t_n) = a_i t_n + b$$

where $t_n$ is the n-th time window from T0 to T1 time period, ai is the best slope of the least square method fitting curve, $\Delta z_i(t_n)$ is the relative impedance value of pixel point i at a certain time, and b is the intercept.

In the state of end-expiratory breath holding, the impedance change related to respiration is almost zero, and the impedance change is mainly affected by blood perfusion. After hypertonic saline is injected, the impedance of the corresponding area of pixel points decreases, and the features such as color scale and pixel change accordingly. Based on the changes of color scale and pixel features, the time point when saline enters the ROI area of heart area and lung area can be detected.

S405: a classification result is output whether the patient has right heart failure based on the difference value.

In one embodiment, when the difference value interval exceeds the threshold value, the classification result of right heart failure is output. Specifically, the threshold value or threshold range is determined by the statistical result of the difference between the starting time of saline entering the heart ROI and the time of saline entering the lung ROI in people without right heart failure.

Figure 14A:
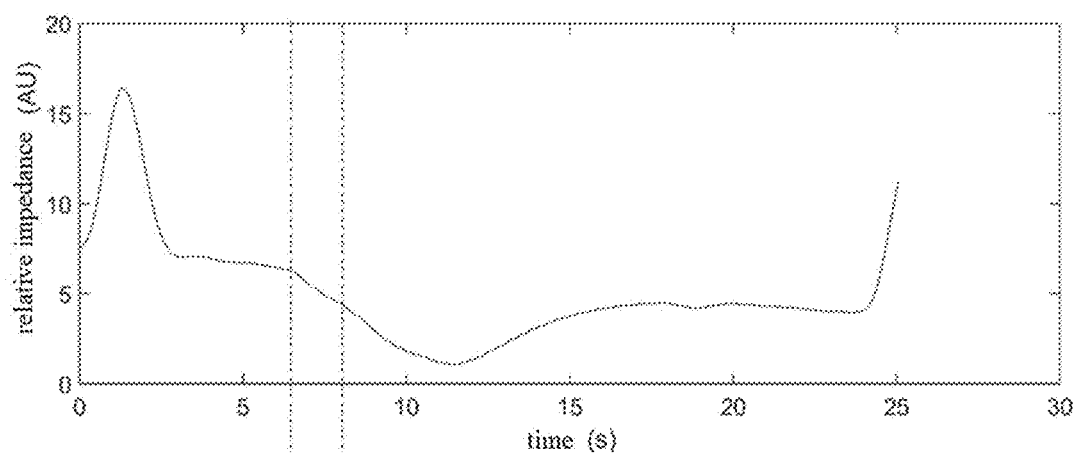
FIG. 14A is an electrical impedance change curve of a patient with normal heart after hypertonic saline injection according to embodiments of the disclosure, showing the time when saline reaches the heart area (dashed line on the left)
Figure 14B:
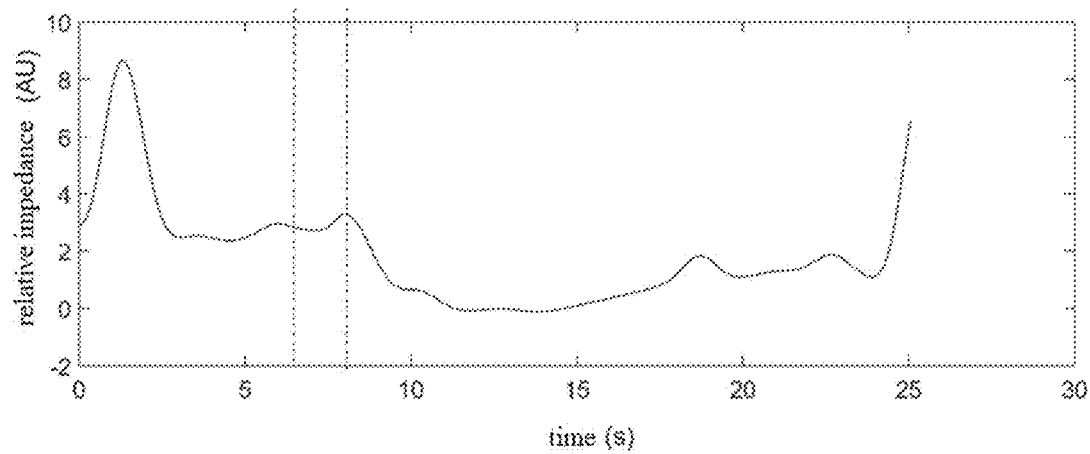
FIG. 14B is an electrical impedance change curve of a patient with normal heart after hypertonic saline injection according to embodiments of the disclosure, showing the time when saline reaches the lungs (dashed line on the right), where the time between saline reaching the heart area and when saline reaching the lungs is 1.5 seconds.
Figure 15A:
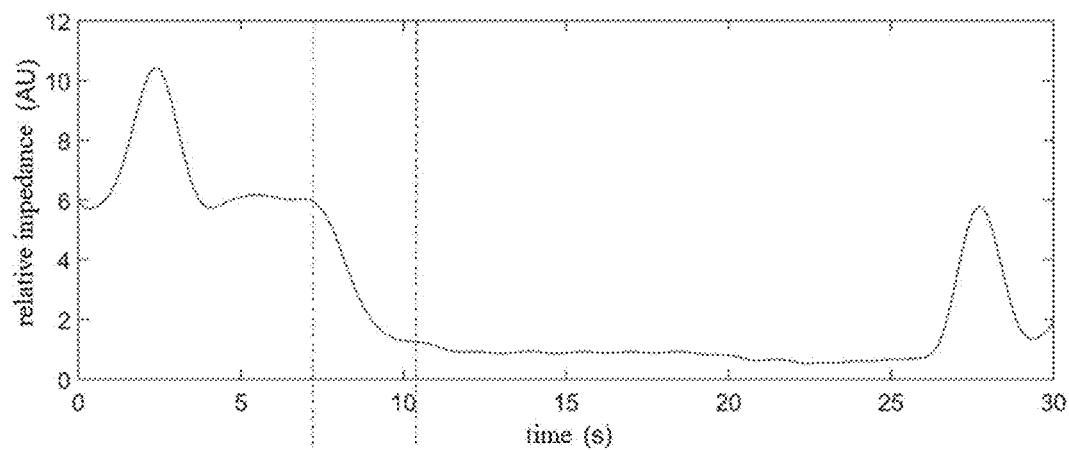
FIG. 15A is an electrical impedance change curve of patients with tricuspid regurgitation after hypertonic saline injection according to embodiments of the disclosure. showing the time when saline reaches the heart area (dashed line on the left)
Figure 15B:
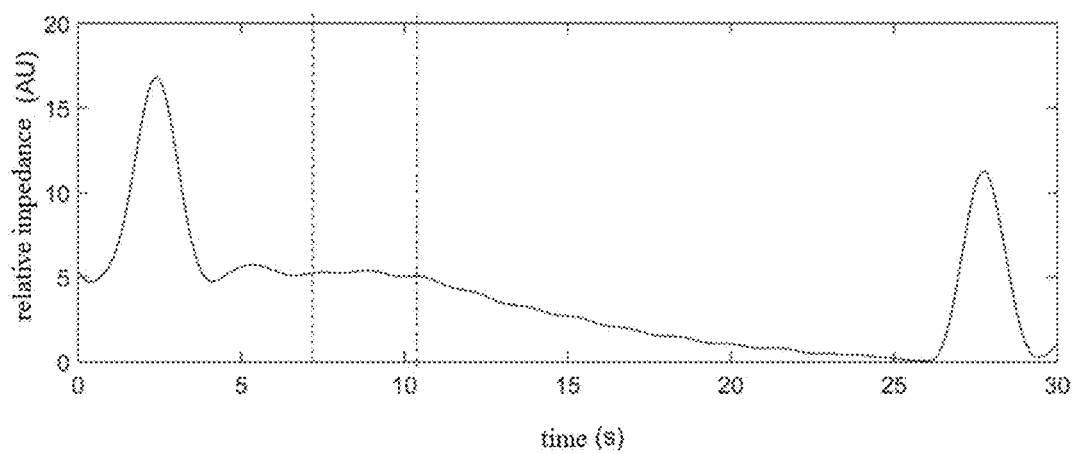
FIG. 15B is an electrical impedance change curve of patients with tricuspid regurgitation after hypertonic saline injection according to embodiments of the disclosure, showing the time when saline reaches the lung (dashed line on the right), where the time between saline reaching the heart area and when saline reaching the lung is 3.2 seconds.

In a specific embodiment, FIG. 14A and FIG. 14B are electrical impedance change curves of a patient with normal heart after hypertonic saline injection provided by the embodiment of the disclosure. FIG. 14A shows the time when saline reaches the heart area (dashed line on the left), and FIG. 14B shows the time when saline reaches the lungs (dashed line on the right), which takes 1.5 seconds. FIG. 15A and FIG. 15B are the change curves of electrical impedance of patients with tricuspid regurgitation after hypertonic saline injection provided by the embodiment of the disclosure. FIG. 15A shows the time when saline reaches the heart area (dashed line on the left), and FIG. 15B shows the time when saline reaches the lungs (dashed line on the right), which takes 3.2 seconds. Specifically, when the difference value interval exceeds the threshold value of 2.5 seconds, the classification result of right heart failure is output, and when the difference interval is lower than the threshold of 2.5 seconds, the classification result of right heart failure is output. There is no classification result of right heart failure.

The right heart failure includes valvular disease, embolic disease, chronic lung disease, idiopathic pulmonary hypertension, congenital heart disease, etc. The above-mentioned diseases show that the right cardiac output is reduced or slowed down due to right cardiac insufficiency, which further leads to a longer time for concentrated saline to become flow from the right atrium and right ventricle to the lung with blood flow.

In a specific embodiment, the right heart failure is tricuspid regurgitation. Tricuspid regurgitation (TR) is a common valvular disease, which can be caused by right ventricular volume and pressure overload or cardiac cavity dilatation. According to the pathological change results, tricuspid valve lesions can be divided into tricuspid atresia, tricuspid insufficiency, and ebstein anomaly. The method described in this disclosure can be used for early monitoring of the above diseases.

In a specific embodiment, the right heart failure is an embolic disease. Pulmonary embolism is the most common cause of acute right ventricular load aggravation in adults, so embolic diseases such as pulmonary embolism can be monitored early based on the method described in this disclosure.

In a specific embodiment, the right heart failure is a chronic lung disease. Pulmonary heart disease can be manifested as right ventricular hypertrophy, asymptomatic right ventricular dysfunction and right heart failure. Therefore, based on the method described in this disclosure, chronic lung diseases can be monitored at an early stage.

In a specific embodiment, the right heart failure is congenital heart disease. Congenital heart disease includes right ventricular overload caused by huge atrial septal defect combined with left-to-right shunt, pulmonary valve regurgitation after tetralogy of Fallot repair, congenital right atrioventricular valve displacement deformity, mechanical obstruction of right ventricular outflow tract or hemodynamic disorder transposition of great arteries, etc. Based on the method described in this disclosure, the above diseases can be monitored at an early stage.

In one embodiment, the right heart failure image analysis method based on saline contrast in the embodiment of the disclosure mainly includes the following steps:
  patient EIT impedance signals are obtained, including impedance signals in ventilation stage and impedance signals in saline contrast stage;
  low-pass filtering is performed on the impedance signal in the ventilation stage to generate a lung area impedance curve;
  band-pass filtering is performed on the impedance signal in the ventilation stage to generate a heart area impedance curve;
  a time when an heart area impedance curve begins to decline is selected as a starting time (T0) when saline enters the heart area, a time when a lung area impedance curve begins to decline is selected as a time (T1) when saline enters the lung area, a difference value between a starting time of saline entering the heart area and a time of saline entering the lung area is calculated.
  a classification result of whether the patient has right heart failure is output based on the difference value.

In a specific embodiment, the method can also be:
  patient EIT impedance signals are obtained, including impedance signals in ventilation stage and impedance signals in saline contrast stage;
  low-pass filtering is performed on the impedance signals in the ventilation stage to generate a lung area ROI graph and a lung area impedance curve;
  low-pass filtering is performed on the impedance signals in the ventilation stage to generate a lung area ROI graph and a lung area impedance curve;
  a difference value between a starting time of saline entering the heart area ROI and a time of saline entering the lung area ROI is calculated as a first difference value based on
  an impedance descend of the heart area ROI and the lung area ROI in the saline contrast stage;
  a time when an heart area impedance curve begins to decline is selected as a starting time (T0) when saline enters the heart area, a time when a lung area impedance curve begins to decline is selected as a time (T1) when saline enters the lung area, a difference value between a starting time of saline entering the heart area and a time of saline entering the lung area is calculated, as a second difference value;

a classification result of whether the patient has right heart failure is output based on the first difference value and/or the second difference value, or an average value of the two.

In a specific embodiment, the first difference value calculated based on the image and the second difference value calculated based on the impedance curve or the average value of both can be referenced at the same time.

Figure 16:
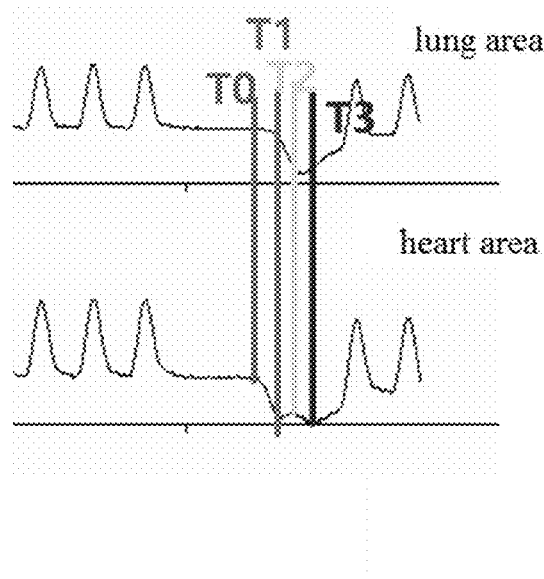
FIG. 16 is an impedance curve diagram according to embodiments of the disclosure, where the impedance curve in the heart area begins to descend as the starting time (T0) when saline enters the heart area, and the impedance curve in the lung area begins to descend as the time (T1) when saline enters the lung area.

In one embodiment, the overall resistance curve begins to decrease during breath holding as the starting point (T0) of saline entering the heart, and the impedance of the lung area begins to decrease as the time point (T1) when saline enters the pulmonary blood vessels and reaches the lung area. Specifically, the starting time (T0) when the saline enters the heart area and the time (T1) when the saline enters the lung area are shown in FIG. 16. When the saline flows back to the heart area again, the impedance-time curve of the heart area will descent again, the starting point of descent is time point T2, and the second valley bottom time point is time point T3.

Figure 5:
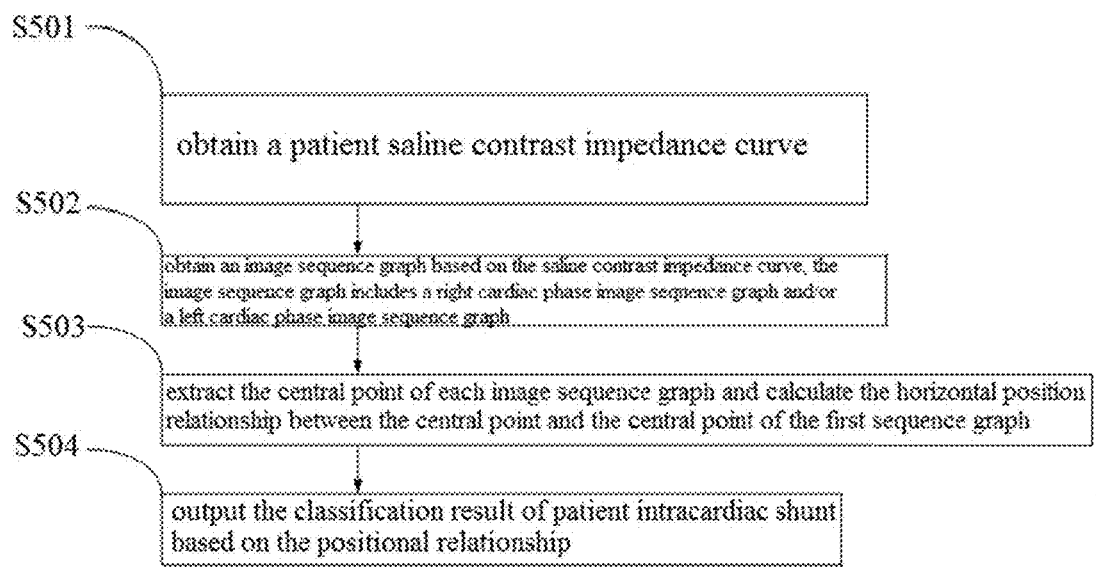
FIG. 5 is a schematic flow chart of an intracardiac shunt image analysis method according to embodiments of the disclosure.

FIG. 5 is a flowchart of an intracardiac shunt image analysis method in an embodiment of the disclosure, specifically including the following steps:

S501: a patient saline contrast impedance curve is obtained;

In one embodiment, the patient saline contrast impedance curve includes a series of electrical impedance changes based on the strong saline and following blood flow to flow through the superior vena cava→right atrium, right ventricle→pulmonary circulation→left atrium, left ventricle→aorta.

In this disclosure, the saline contrast impedance curve is also called saline contrast impedance dilution curve.

S502: an image sequence graph is obtained based on the saline contrast impedance curve, where the image sequence graph includes a right cardiac phase image sequence graph and/or a left cardiac phase image sequence graph.

In one embodiment, the right cardiac phase image sequence graph is reconstructed based on the right ventricular blood flow contrast impedance curve in the period of T0-T1 in the saline contrast impedance curve. The left cardiac phase image sequence graph is reconstructed based on the left ventricular blood flow contrast impedance curve in T2-T3 period in the saline contrast impedance curve.

In a specific embodiment, the specific obtain operation of the right cardiac phase image sequence graph is as follows: as shown in FIG. 2, the overall resistance curve begins to decline during the breath-holding period as the starting point (T0) for saline to enter the heart, and then the impedance of a certain ROI lung area begins to decline as the time point (T1) for saline to enter the pulmonary vessels and reach the lung area. Therefore, the impedance curve in the time period from T0 to T1 mainly reflects the period when saline enters aggregation right heart, and the slope is calculated by using the resistance-time change curve in the period of T0-T1, and the right heart imaging components constructed in each time window in the period of T0-T1 are analyzed. Specifically, the calculated slope time window of the resistance-time curve in the T0-T1 period is 0.5 seconds, and the step size is 0.5 seconds. The specific time window of the T0-T1 period is divided from T0 to T0+0.5 seconds, T0+0.5 to T0+1.0 seconds, and so on to T1−0.5 to T1, that is, by analyzing the right heart images constructed in each 0.5 second window in the T0-T1 period. More specifically, the calculation of the optimal slope of the i-th pixel point in the right cardiac image sequence graph is obtained by the calculating formula for the i-th pixel point perfusion volume:

$$\Delta z_i(t_n) = a_i t_n + b$$

where $t_n$ is the n-th time window from T0 to T1 time period, ai is the best slope of the least square method fitting curve, $\Delta z_i(t_n)$ is the relative impedance value of pixel point i at a certain time, and b is the intercept.

In a specific embodiment, the specific obtain operation of the left cardiac phase image sequence graph is as follows: as shown in FIG. 2, when the saline flows back to the pixel point in the heart area, the position where the impedance time curve will start to decline again is defined as time point T2, and the second valley bottom time point is defined as time point T3. Therefore, the impedance curve of T2-T3 time period mainly reflects that the saline enters the period of aggregation left heart. By using the resistance-time change curve of T2-T3 time period, the slope is calculated, and the left heart imaging components constructed in each time window of T2-T3 time period are analyzed. The method to determine the heart region is to make $a_{max}$ be the slope of the pixel point with the largest slope during T0-T1, and define the pixel point with a pixel point slope of $a > 20\% \times a_{max}$ as the heart region. During T2-T3, the impedance descending slope c of the i-th pixel point in the left cardiac phase image sequence graph is calculated by the following formula:

$$\Delta z_i(t_m) = c_i t_m + d$$

where $t_m$ is the m-th time window in the T2-T3 time period, ci is the best slope of the least square method fitting curve, $\Delta z_i(t_m)$ is the relative impedance value of pixel point i at a certain time in the T2-T3 time period, and d is the intercept.

S503: the central point of each image sequence graph is extracted and the horizontal position relationship between the central point and the central point of the first sequence graph is calculated.

In one embodiment, the horizontal position of the central point of the sequence graph is determined as follows:

$$CoH(t_k) = \sum (x_i \times f_i) / \sum f_i \times 100\%$$

where i belongs to the heart region H, $x_i$ is the abscissa of the pixel point i, $f_i$ is the best impedance decline slope of the least square fitting curve of the i-th pixel point, $CoH(t_k)$ represents the abscissa position of the heart center at $t_k$ moment, and $t_k$ is the k-th time window.

Furthermore, the heart region H is a pixel point with the pixel point impedance decline slope $f > 20\% \times f_{max}$, and $f_{max}$ is the slope of the pixel point with the largest slope. Specifically, the impedance decline slope f is calculated by the following formula:

$$\Delta z_i(t_k) = f_i t_k + e$$

where $\Delta z_j(t_k)$ is the relative impedance value of pixel point i at time $t_k$ and e is the intercept.

Figure 17A:
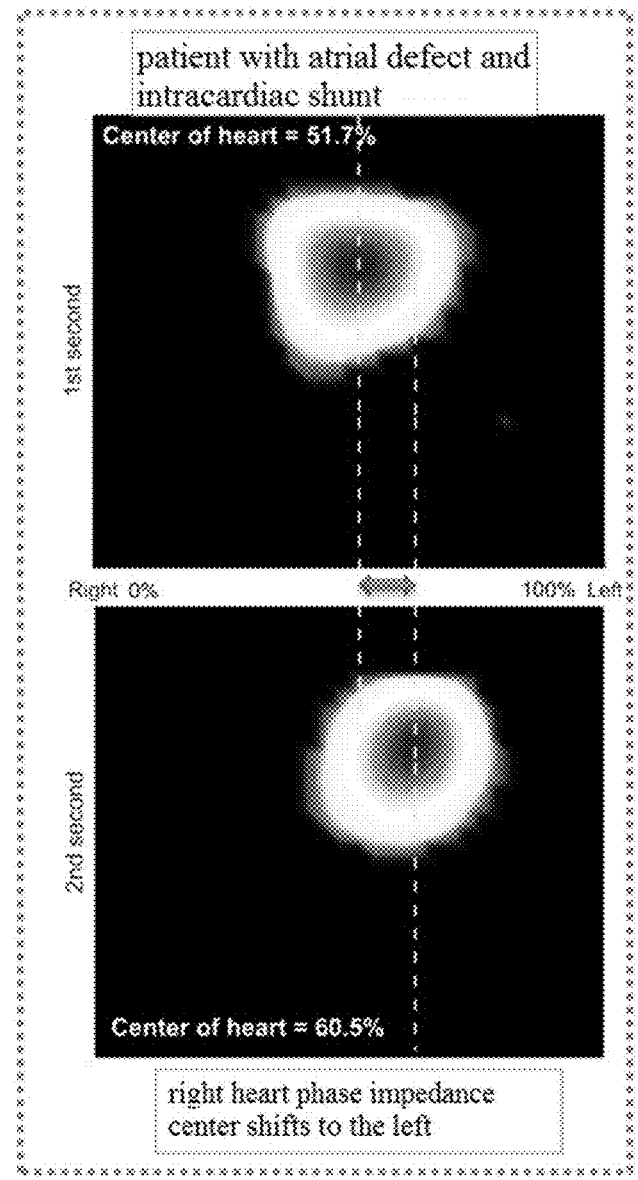
FIG. 17A is a schematic diagram of right heart imaging impedance of patients with atrial septal defect and intracardiac shunt according to embodiments of the disclosure.
Figure 17B:
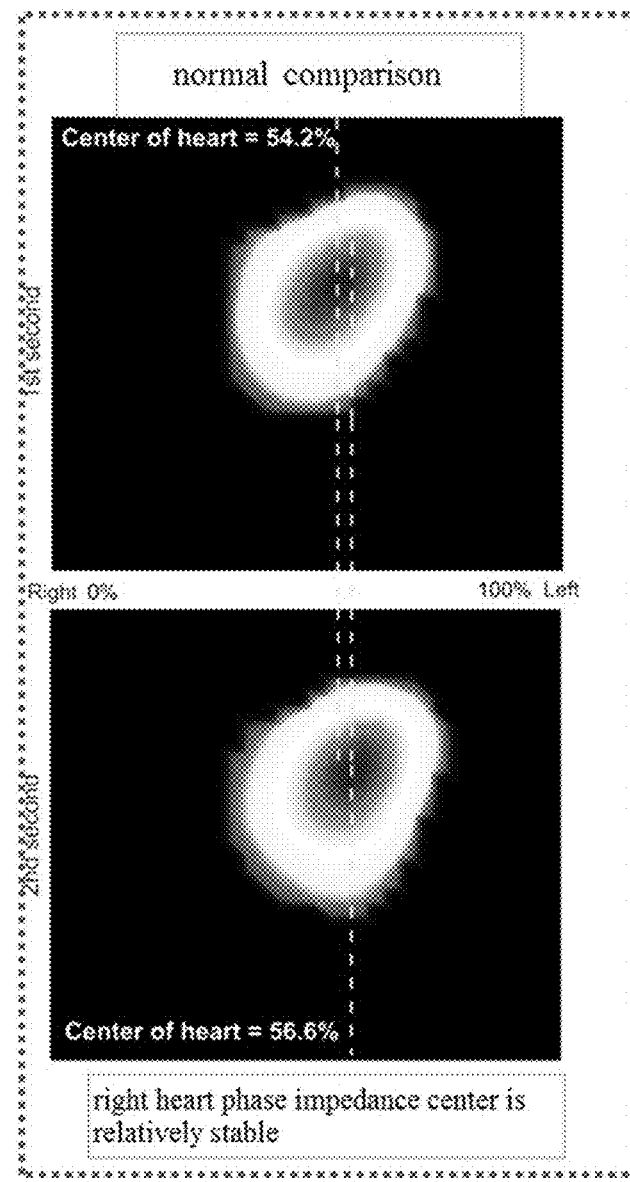
FIG. 17B is a schematic diagram of right heart imaging impedance of normal comparison according to embodiments of the disclosure.

In a specific embodiment, FIG. 17A and FIG. 17B show that the position relationship is determined by calculating the horizontal position offset of the right heart imaging impedance center.

Figure 18A:
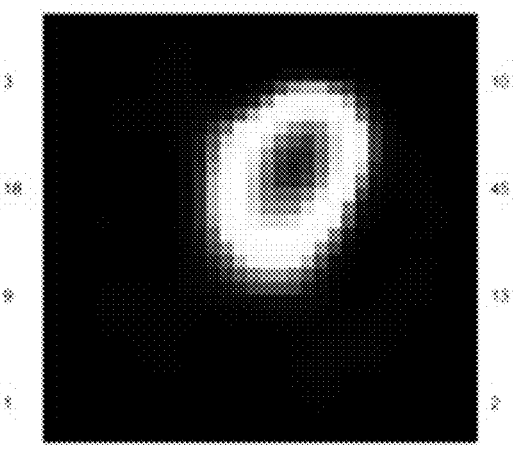
FIG. 18A is a schematic diagram of constructing the right cardiac phase of saline focusing on the right heart based on a saline contrast curve according to embodiments of the disclosure.
Figure 18B:
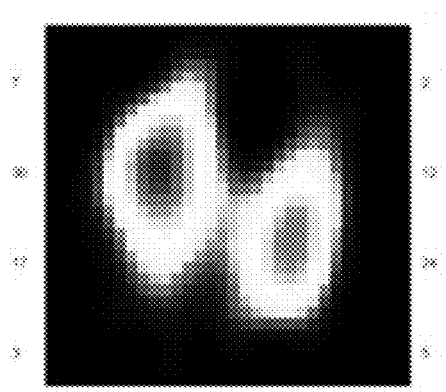
FIG. 18B is a schematic diagram of constructing the pulmonary phase of bilateral lung perfusion based on a saline contrast curve according to embodiments of the disclosure.
Figure 18C:
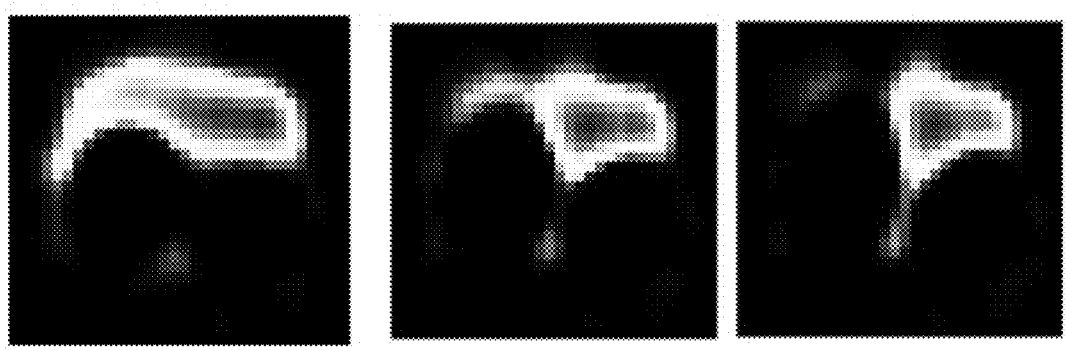
FIG. 18C is a schematic diagram of constructing the left cardiac phase of saline returning to the left cardiac series imaging phase through pulmonary circulation based on a saline contrast curve according to embodiments of the disclosure.
Figure 18D:
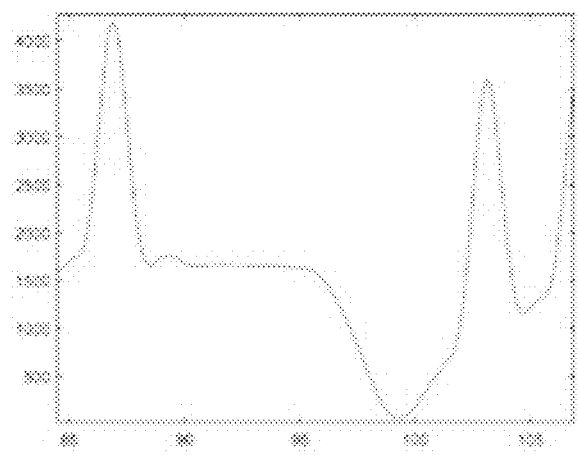
FIG. 18D is a schematic diagram of saline contrast time-impedance curve.

In a more extensive embodiment, each image sequence graph is obtained by constructing a series of impedance images based on the saline contrast impedance curve (as shown in FIG. 18D), and the constructed image sequence graph also includes constructed different sequence images based on saline contrast time-impedance curve as shown in FIG. 18A, FIG. 18B and FIG. 18C: FIG. 18A shows the right cardiac phase of saline focusing on the right heart, FIG. 18B shows the pulmonary phase of bilateral lung perfusion, and FIG. 18C shows the left cardiac phase of saline returning to the left cardiac series imaging phase through pulmonary circulation.

S504: based on the positional relationship, the classification result of patient intracardiac shunt is output.

In one embodiment, the application of right heart imaging judges whether there is intracardiac right-to-left shunt by judging whether there is a phenomenon that the right heart imaging impedance center moves to the left.

In one embodiment, the application of left heart imaging judges whether there is intracardiac left-to-right shunt by judging whether there is a phenomenon that the saline accumulation center moves to the right.

As shown in FIG. 17A and FIG. 17B, the right heart imaging impedance center shift is calculated according to the positional relationship to determine whether there is right-to-left shunt blood flow, in which on the left is a patient with atrial septal defect and intracardiac shunt whose right heart imaging impedance center shifts to the left (+9.2%), on the right is the left shift of the right heart imaging impedance center in the normal comparison is not obvious (−2.4%). Therefore, it is a bedside, non-invasive, non-radiation and more practical method to judge whether there is intracardiac right-to-left shunt by monitoring whether there is a left shift of saline accumulation center in the right cardiac phase during saline impedance contrast.

In a more complete specific embodiment, the intracardiac shunt image analysis method based on saline contrast shown in FIG. 5 further includes an intracardiac right-to-left shunt analysis method based on saline contrast and an intracardiac left-to-right shunt analysis method based on saline contrast.

The schematic graph of the intracardiac right-to-left shunt analysis method based on saline contrast in the embodiment of the disclosure mainly includes the following steps:

step 1, a patient saline contrast impedance curve is obtained;

step 2, a right cardiac phase image sequence graph is obtained based on the saline contrast impedance curve;

step 3, the central point of each image sequence graph in the right cardiac image sequence graph is extracted, and the horizontal position relationship between the central point and the central point of the first sequence graph is calculated;

step 4, a classification result of whether that patient has intracardiac right-to-left shunt is output base on whether the positional relationship is left.

More specifically, the slope time windows are calculated by using the resistance-time change curve of T0-T1 time period, and the right heart imaging corresponding to each time window is constructed to obtain the right heart phase image sequence graph.

Preferably, the slope calculation window of the resistance-time curve is 0.5 seconds, and the step size is 0.5 seconds, that is, the time window of T0-T1 time period is divided from T0 to T0+0.5 seconds, T0+0.5 to T0+1.0 seconds, and so on to T1−0.5 to T1.

Where, each image sequence graph in the right cardiac phase image sequence graph corresponds to the right heart imaging constructed in each 0.5-second time window in the T0-T1 time period being analyzed through step 2.

Further, the first sequence graph in step 3 refers to the right heart imaging constructed from the time window of T0 to T0+0.5 seconds, and the horizontal position of the central point of the first sequence graph is calculated as follows:

$$CoH(t_1) = \sum (x_i \times a_i) / \sum a_i \times 100\%$$

Further, the horizontal position of the central point of each image sequence graph in the right cardiac image sequence graph is calculated as follows:

$$CoH(t_n) = \sum (x_i \times a_i) / \sum a_i \times 100\%$$

where $x_i$ is the abscissa of the pixel i, the pixel i belongs to the heart area, $CoH(t_n)$ is the abscissa of the heart central point at the time $t_n$, and $t_n$ is the n-th time window from T0 to T1 time period.

Furthermore, the positional relationship is to obtain the relative offset position by comparing the sizes of $CoH(t_n)$ and $CoH(t_1)$, that is, when $CoH(t_n)<CoH(t_1)$, the positional relationship is left; when $CoH(t_n) \geq CoH(t_1)$, the positional relationship is not left.

When the position relation is left, the classification result that the patient has intracardiac right-to-left shunt is output; when the positional relationship is not left, the classification result that the patient does not have intracardiac right-to-left shunt is output.

The schematic graph of the intracardiac left-to-right shunt analysis method based on saline contrast in the embodiment of the disclosure mainly includes the following steps:

step 1, a patient saline contrast impedance curve is obtained;

step 2, a left cardiac phase image sequence graph is obtained based on the saline contrast impedance curve;

step 3, the central point of each image sequence graph in the left cardiac image sequence graph is extracted, and the horizontal position relationship between the central point and the central point of the first sequence graph is calculated; and step 4, a classification result of whether the patient has intracardiac left-to-right shunt or not is output base on whether the positional relationship is on the right.

Where, the left cardiac phase image sequence graph is reconstructed based on the left ventricular blood flow contrast impedance curve in the T2-T3 time period in the saline contrast impedance curve.

Each image sequence graph in the left cardiac phase image sequence graph corresponds to the left heart imaging constructed in each time window in the T2-T3 time period being analyzed through step 2.

Further, the first sequence graph in step 3 refers to the left heart imaging constructed by the first time window, and the horizontal position $CoH(t_{11})$ of the central point of the first sequence graph is calculated as follows:

$$CoH(t_{11}) = \sum (x_i \times c_i)/\sum c_i \times 100\%$$

Further, the horizontal position of the central point of each image sequence graph in the left cardiac image sequence graph is calculated as follows:

$$CoH(t_m) = \sum (x_i \times c_i)/\sum c_i \times 100\%$$

where $x_i$ is the abscissa of pixel point i, pixel point i belongs to the heart area, $CoH(t_m)$ is the abscissa of the heart central point at $t_m$ moment, and $t_m$ is the m-th time window of T2-T3 time period.

Furthermore, the positional relationship can get the relative offset position by comparing the sizes of $CoH(t_m)$ and $CoH(t_{11})$, that is, when $CoH(t_m)$ $CoH(t_{11})$, the positional relationship is not on the right; when $CoH(t_m)>CoH(t_{11})$, the positional relationship is to the right.

When the positional relationship is on the right, the classification result that the patient has intracardiac left-to-right shunt is output; when the positional relationship is not on the right, the classification result that the patient does not have intracardiac left-to-right shunt is output.

It is feasible to apply the above method to the classification of intracardiac shunt. Similarly, it shows that it is feasible to judge whether there is intracardiac left-to-right shunt by monitoring whether the saline accumulation center moves to the right in the left cardiac phase impedance dilution curve. Similarly, it is feasible to judge whether there is intracardiac right-to-left shunt by monitoring whether the saline accumulation center moves to the left in the right cardiac phase during the saline impedance contrast, which provides more accurate information for the prediction and analysis of patients' intracardiac shunt. It is a bedside, non-invasive, non-radiation and more practical method to better reflect the specific situation and effect of intracardiac shunt, which makes the disclosure more advantageous in the application of the saline contrast data to the auxiliary diagnosis of heart diseases and the auxiliary analysis of the occurrence and development of diseases.

Figure 6:
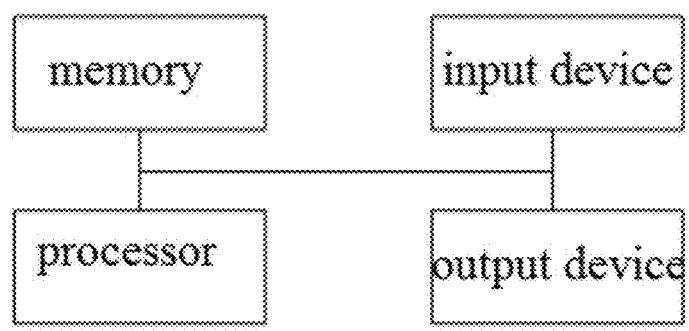
FIG. 6 is a schematic diagram of a device according to embodiments of the disclosure.

FIG. 6 is a schematic diagram of device in an embodiment of the disclosure; including:
a memory and a processor;
the device may further include an input device and an output device.
the memory, the processor, the input device and the output device can be connected by a bus or other mode, and the bus connection mode shown in FIG. 6 is taken as an example.

Where, the memory is used for storing program instructions; the processor is used for calling program instructions, and when the program instructions are executed, the processor is used for executing and implementing the saline contrast lung perfusion image reconstruction method, or for executing and implementing the pulse perfusion image reconstruction method; or used for executing and implementing the lung perfusion and regional V/Q non-invasive imaging method; or for executing and implementing the right heart failure image analysis method; or for executing the intracardiac shunt image analysis method.

The embodiment of the disclosure provides a saline contrast lung perfusion image reconstruction system, which includes:

a obtaining module 101, configured for obtaining a patient saline contrast electrical impedance dilution curve;
a generating module 102, configured for Inputting the patient saline contrast electrical impedance dilution curve into a pre-trained deep learning model to generate a saline contrast-based reconstruction SPECT graph of a patient.

The embodiment of the disclosure provides a pulsatile perfusion image reconstruction system, which includes:
an obtaining module 201, configured for obtaining a patient pulmonary vascular pulsatile graph;
a first generating module 202, configured for obtaining patient synchronous saline contrast impedance dilution curves, and generating saline contrast-based lung perfusion images of a patient;
a calculation module 203, configured for calculating a ratio of blood flow impedance data in the saline contrast-based lung perfusion image to pulsatile impedance data in the pulsatile graph or calculating a ratio of pixel points in the saline contrast-based lung perfusion image to pixel points in the pulsatile graph, to generate a correction factor;
a second generation module 204, configured for generating a pulsatile perfusion image corrected by saline contrast based on the correction factor and the pulsatile graph.

The embodiment of the disclosure provides a lung perfusion and regional V/Q non-invasive imaging system, which includes:
a first obtaining module 301, configured for obtaining a patient pulmonary vascular pulsatile graph;
a generating module 302, configured for generating a pulsatile perfusion image corrected by saline contrast based on the saline contrast pulsatile perfusion image reconstruction method;
a second obtaining module 303, configured for obtaining a patient pulmonary ventilation graph;
an imaging module 304, configured for constructing a pulmonary ventilation/blood flow graph by using the patient pulmonary ventilation graph and the pulsatile perfusion image corrected by saline contrast.

The embodiment of the disclosure provides a right heart failure image analysis system, which includes:
an obtaining module 401, configured for obtaining patient EIT impedance signals, including impedance signals in ventilation stage and impedance signals in saline contrast stage;
a first generating module 402, configured for performing low-pass filtering on the impedance signals in the ventilation stage to generate a lung area ROI graph;
a calculation module 404, configured for performing band-pass filtering on the impedance signals in the ventilation stage to generate a heart area ROI graph;
an output module 405, configured for calculating a difference value between a starting time of saline entering heart area ROI and a time of saline entering lung area ROI, based on impedance descend in a saline contrast stage.

The embodiment of the disclosure provides an intracardiac shunt image analysis system, which includes:
an obtaining module 501, configured for obtaining a patient saline contrast impedance curve;
an image reconstruction module 502, configured for obtaining an image sequence graph based on the patient saline contrast impedance curve, where the image sequence graph includes a right cardiac phase image sequence graph and/or a left cardiac phase image sequence graph;

a calculation module 503, configured for extracting a central point of each image sequence graph and calculating a horizontal position relationship between the central point and a central point of the first sequence graph;

an output module 504, configured for outputting a classification result of the patient intracardiac shunt.based on the positional relationship.

It can be clearly understood by those skilled in the art that for the convenience and conciseness of description, the specific working processes of the systems, devices and modules described above can refer to the corresponding processes in the aforementioned method embodiments, and will not be repeated here.

In several embodiments provided by this disclosure, it should be understood that the disclosed systems, devices and methods can be realized in other ways. For example, the device embodiment described above is only schematic. For example, the division of modules is only a logical function division. In actual implementation, there may be other division methods, such as multiple modules or components can be combined or integrated into another system, or some features can be ignored or not implemented. On the other hand, the mutual coupling or direct coupling or communication connection shown or discussed can be indirect coupling or communication connection through some interfaces, devices or modules, which can be electrical, mechanical or other forms.

The modules described as separate components may or may not be physically separated, and the components displayed as modules may or may not be physical modules, that is, they may be located in one place or distributed to multiple network modules. Some or all of the modules can be selected according to actual needs to achieve the purpose of this embodiment scheme.

In addition, each functional module in each embodiment of the disclosure may be integrated into one processing module, or each module may exist physically alone, or two or more modules may be integrated into one module. The above-mentioned integrated modules can be realized in the form of hardware, can also be realized in the form of software functional modules.

Those skilled in the art can understand that all or part of the steps in various methods of the above embodiments can be completed by instructing related hardware through a program, which can be stored in a computer-readable storage medium, which can include: ReadOnlyMemory (ROM), RandomAccessMemory (RAM), magnetic disk or optical disk, etc.

Those skilled in the art can understand that all or part of the steps in the method for realizing the above-mentioned embodiments can be completed by instructing related hardware through a program, and the program can be stored in a computer-readable storage medium, and the above-mentioned storage medium can be read-only memory, magnetic disk or optical disk, etc.

What is claimed is:

1. A pulsatile perfusion image reconstruction method corrected by saline contrast, wherein the method comprises:
   obtaining a patient band-pass filtering electrical impedance curve to generate a pulsatile graph;
   obtaining a patient synchronous saline contrast impedance dilution curve to generate a saline contrast-based lung perfusion image of a patient;
   calculating a ratio of blood flow impedance data in the saline contrast-based lung perfusion image to pulsatile impedance data in the pulsatile graph to generate a correction factor;
   generating a pulsatile perfusion image corrected by saline contrast based on the correction factor and the pulsatile graph.

2. The pulsatile perfusion image reconstruction method corrected by saline contrast according to claim 1, wherein the pulsatile perfusion image corrected by saline contrast is a pulsatile perfusion image corrected by SPECT graph reconstructed by saline contrast or a pulsatile perfusion image corrected by saline contrast EIT graph.

3. The pulsatile perfusion image reconstruction method corrected by saline contrast according to claim 1, wherein obtaining the patient synchronous saline contrast impedance dilution curve, extracting multi-parameter features of the saline contrast impedance dilution curve, and generating a saline contrast EIT lung perfusion image of the patient by combining an image reconstruction algorithm, wherein the multi-parameter features comprise one or more of following features: a curve maximum impedance decline amplitude value, an area under the curve, a maximum slope, an average transmission time, and a thoracic morphology correction.

4. The pulsatile perfusion image reconstruction method corrected by saline contrast according to claim 1, wherein generating saline contrast-based lung perfusion graph of the patient is to generate a saline contrast-based reconstruction SPECT graph of the patient or generate a saline contrast EIT lung perfusion image of the patient, wherein generating the saline contrast EIT lung perfusion image of the patient comprises: obtaining a synchronous saline contrast impedance dilution curve of the patient, and generating the saline contrast EIT lung perfusion image of the patient by combining the saline contrast impedance dilution curve of the patient with the image reconstruction algorithm; wherein generating saline contrast-based reconstruction SPECT graph of the patient comprises: obtaining the patient synchronous saline contrast impedance dilution curve, inputting the saline contrast impedance dilution curve into a pre-trained deep learning model, and generating the saline contrast-based reconstruction SPECT graph of the patient.

5. The pulsatile perfusion image reconstruction method corrected by saline contrast according to claim 1, wherein the correction factor is a correction factor of each of lung perfusion regions, and the lung perfusion regions are divided into different lung perfusion regions according to different dividing methods.

6. A pulsatile perfusion image reconstruction device corrected by saline contrast, comprising: a memory and a processor; wherein the memory is used for storing program instructions; the processor is used for calling program instructions, and when the program instructions are executed, the processor is used for implementing the pulsatile perfusion image reconstruction method corrected by saline contrast according to claim 1.

7. The pulsatile perfusion image reconstruction device corrected by saline contrast according to claim 6, wherein the pulsatile perfusion image corrected by saline contrast is a pulsatile perfusion image corrected by SPECT graph reconstructed by saline contrast or a pulsatile perfusion image corrected by saline contrast EIT graph.

8. The pulsatile perfusion image reconstruction device corrected by saline contrast according to claim 6, wherein the patient synchronous saline contrast impedance dilution curve is obtained, multi-parameter features of the saline contrast impedance dilution curve are extracted, and a saline contrast EIT lung perfusion image of the patient is generated by combining an image reconstruction algorithm, wherein the multi-parameter features comprise one or more of following features: a curve maximum impedance decline amplitude value, an area under the curve, a maximum slope, an average transmission time, and a thoracic morphology correction.

9. The pulsatile perfusion image reconstruction device corrected by saline contrast according to claim 6, wherein generating saline contrast-based lung perfusion graph of the patient is generating a saline contrast-based reconstruction SPECT graph of the patient or generate a saline contrast EIT lung perfusion image of the patient, wherein generating the saline contrast EIT lung perfusion image of the patient comprises: a synchronous saline contrast impedance dilution curve of the patient is obtained, and the saline contrast EIT lung perfusion image of the patient is generated by combining the saline contrast impedance dilution curve of the patient with the image reconstruction algorithm; wherein generating saline contrast-based reconstruction SPECT graph of the patient comprises: the patient synchronous saline contrast impedance dilution curve is obtained, the saline contrast impedance dilution curve is inputted into a pre-trained deep learning model, and the saline contrast-based reconstruction SPECT graph of the patient is generated.

10. The pulsatile perfusion image reconstruction device corrected by saline contrast according to claim 6, wherein the correction factor is a correction factor of each of lung perfusion regions, and the lung perfusion regions are divided into different lung perfusion regions according to different dividing methods.

\* \* \* \* \*